(12) United States Patent
Nishitani et al.

(10) Patent No.: US 8,218,947 B2
(45) Date of Patent: Jul. 10, 2012

(54) VIDEO DATA RECORDING APPARATUS AND METHOD, AND VIDEO DATA REPRODUCING APPARATUS AND METHOD

(75) Inventors: Masayoshi Nishitani, Kanagawa-ken (JP); Toshio Kuroiwa, Kanagawa-ken (JP); Seiji Higurashi, Tokyo-to (JP)

(73) Assignee: Victor Company of Japan, Ltd., Yokohama (JP)

( * ) Notice: Subject to any disclaimer, the term of this patent is extended or adjusted under 35 U.S.C. 154(b) by 1236 days.

(21) Appl. No.: 11/987,620

(22) Filed: Dec. 3, 2007

(65) Prior Publication Data

US 2008/0131098 A1 Jun. 5, 2008

(30) Foreign Application Priority Data

Dec. 4, 2006 (JP) ................................. 2006-326704
Jan. 31, 2007 (JP) ................................. 2007-020708
Oct. 18, 2007 (JP) ................................. 2007-271031

(51) Int. Cl.
*H04N 5/78* (2006.01)
*G06F 9/00* (2006.01)

(52) U.S. Cl. ..... 386/314; 386/239; 386/326; 369/30.01; 369/30.04; 369/30.07; 369/30.08; 369/47.1; 705/904; 705/911; 705/912; 713/1

(58) Field of Classification Search ............... 369/30.01, 369/30.04, 30.07, 30.08, 47.1; 713/1; 386/239, 386/314, 326; 705/904, 911, 912
See application file for complete search history.

(56) References Cited

U.S. PATENT DOCUMENTS

| | | | | |
|---|---|---|---|---|
| 5,452,097 A | * | 9/1995 | Koga et al. | 386/230 |
| 5,901,119 A | * | 5/1999 | Inoue | 369/30.09 |
| 6,442,327 B1 | * | 8/2002 | Yamada et al. | 386/248 |
| 6,600,868 B2 | * | 7/2003 | Tokashiki | 386/230 |
| 2001/0005843 A1 | * | 6/2001 | Tokashiki | 707/1 |
| 2002/0184481 A1 | * | 12/2002 | Bish et al. | 713/1 |
| 2004/0018007 A1 | * | 1/2004 | Akita | 386/125 |
| 2005/0007917 A1 | * | 1/2005 | Kim et al. | 369/47.28 |
| 2005/0008346 A1 | * | 1/2005 | Noguchi et al. | 386/125 |
| 2005/0286363 A1 | * | 12/2005 | Han | 369/47.1 |
| 2006/0153016 A1 | * | 7/2006 | Seo et al. | 369/30.01 |
| 2006/0280084 A1 | * | 12/2006 | Kuroiwa et al. | 369/53.2 |
| 2006/0291805 A1 | * | 12/2006 | Mita | 386/95 |
| 2007/0002698 A1 | * | 1/2007 | Nishitani et al. | 369/30.07 |
| 2007/0174334 A1 | * | 7/2007 | Inoue et al. | 707/104.1 |

FOREIGN PATENT DOCUMENTS

JP 2002-157824 5/2002
JP 2004-127471 4/2004

* cited by examiner

*Primary Examiner* — Philip Chea
*Assistant Examiner* — Shanto M Abedin
(74) *Attorney, Agent, or Firm* — Louis Woo

(57) ABSTRACT

Video data is divided into portions which are sequentially recorded on recording mediums respectively. IDs of the respective recording mediums are set. IDs of the respective video data portions are set. Items are recoded on first one among the recording mediums. These items are the ID of the first recording medium, the ID of first one among the video data portions, the ID of second one among the recording mediums which follows the first recording medium, and the ID of second one among the video data portions. Items are recorded on last one among the recording mediums. These items are the ID of the last recording medium, the ID of last one among the video data portions, the ID of second last one among the recording mediums which precedes the last recording medium, and the ID of second last one among the video data portions.

5 Claims, 14 Drawing Sheets

FIG. 4
| DISC | DISC ID | DATA ID OF DATA IN PRECEDING OR FOLLOWING DISC | DATA ID OF DATA IN PRESENT DISC | SEQUENCE ID | PLAYBACK ORDER |
|---|---|---|---|---|---|
| PRESENT | | – | – | – | – |
| PRECEDING | | | | | |
| FOLLOWING | | | | | |
FIG. 5
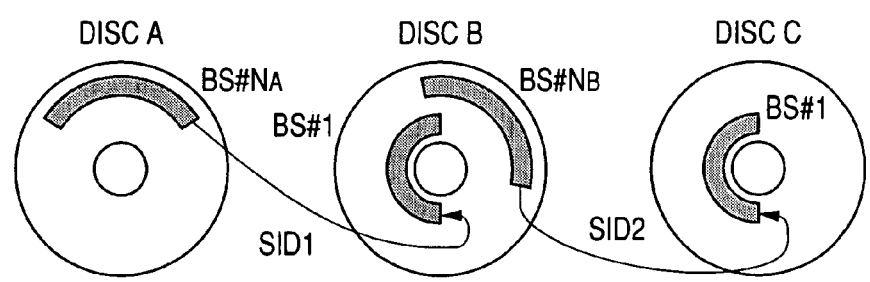
FIG. 6
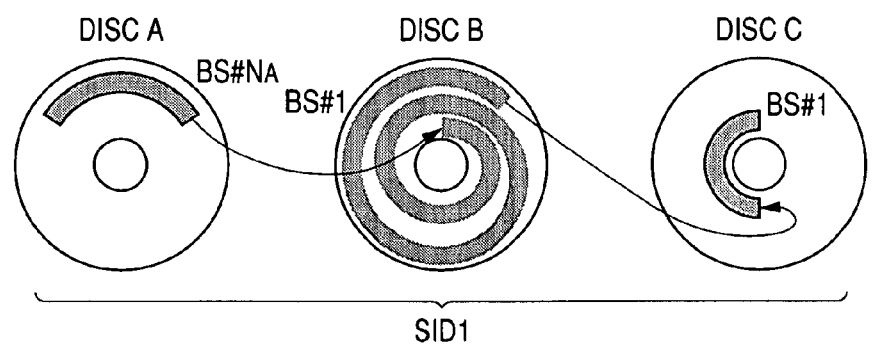

FIG. 7

| DISC | DISC ID | DATA ID OF DATA IN PRECEDING OR FOLLOWING DISC | DATA ID OF DATA IN PRESENT DISC | SEQUENCE ID | PLAYBACK ORDER |
|---|---|---|---|---|---|
| PRESENT | DIDA | – | – | – | – |
| PRECEDING | | | | | |
| FOLLOWING | NEXT | NEXT | BS#NA | SID1 | 1 |

FIG. 8

| DISC | DISC ID | DATA ID OF DATA IN PRECEDING OR FOLLOWING DISC | DATA ID OF DATA IN PRESENT DISC | SEQUENCE ID | PLAYBACK ORDER |
|---|---|---|---|---|---|
| PRESENT | DIDB | – | – | – | – |
| PRECEDING | DIDA | BS#NA | BS#1 | SID1 | 2 |
| FOLLOWING | | | | | |

FIG. 9

| DISC | DISC ID | DATA ID OF DATA IN PRECEDING OR FOLLOWING DISC | DATA ID OF DATA IN PRESENT DISC | SEQUENCE ID | PLAYBACK ORDER |
|---|---|---|---|---|---|
| PRESENT | DIDA | – | – | – | – |
| PRECEDING | | | | | |
| FOLLOWING | DIDB | BS#1 | BS#NA | SID1 | 1 |

FIG. 10

| DATA FIELD | CONTENTS |
|---|---|
| manageInfoAmongDiscs() { | (START OF INTER-DISC MANAGE INFO) |
| current_disc_ID | DISC ID OF PRESENT DISC |
| previous_disc_ID | DISC ID OF PRECEDING DISC |
| previous_data_ID | DATA ID OF DATA IN PRECEDING DISC |
| current_data_ID1 | DATA ID OF DATA IN PRESENT DISC WHICH CONTINUES FROM DATA DENOTED BY "previous_data_ID" |
| sequence_ID1 | SEQUENCE ID OF DATA IN PRESENT AND PRECEDING DISCS |
| play_order1 | PLAYBACK ORDER OF PRESENT DISC REGARDING DATA IN PRESENT AND PRECEDING DISCS |
| next_disc_ID | DISC ID OF FOLLOWING DISC |
| next_data_ID | DATA ID OF DATA IN FOLLOWING DISK |
| current_data_ID2 | DATA ID OF DATA IN PRESENT DISC WHICH CONTINUES TO DATA DENOTED BY "next_data_ID" |
| sequence_ID2 | SEQUENCE ID OF DATA IN PRESENT AND FOLLOWING DISCS |
| play_order2 | PLAYBACK ORDER OF PRESENT DISC REGARDING DATA IN PRESENT AND FOLLOWING DISCS |
| } | |

FIG. 19

| DATA FIELD | CONTENTS |
|---|---|
| manageInfoAmongDiscs() { | (START OF INTER-DISC MANAGE INFO) |
| current_disc_ID | DISC ID OF PRESENT DISC |
| previous_disc_ID | DISC ID OF PRECEDING DISC |
| previous_data_ID | DATA ID OF DATA IN PRECEDING DISC |
| previous_data_image_ID | ID OF REPRESENTATIVE IMAGE SIGNAL FOR DATA IN PRECEDING DISC |
| current_data_ID1 | DATA ID OF DATA IN PRESENT DISC WHICH CONTINUES FROM DATA DENOTED BY "previous_data_ID" |
| sequence_ID1 | SEQUENCE ID OF DATA IN PRESENT AND PRECEDING DISCS |
| play_order1 | PLAYBACK ORDER OF PRESENT DISC REGARDING DATA IN PRESENT AND PRECEDING DISCS |
| next_disc_ID | DISC ID OF FOLLOWING DISC |
| next_data_ID | DATA ID OF DATA IN FOLLOWING DISK |
| next_data_image_ID | ID OF REPRESENTATIVE IMAGE SIGNAL FOR DATA IN FOLLOWING DISK |
| current_data_ID2 | DATA ID OF DATA IN PRESENT DISC WHICH CONTINUES TO DATA DENOTED BY "next_data_ID" |
| sequence_ID2 | SEQUENCE ID OF DATA IN PRESENT AND FOLLOWING DISCS |
| play_order2 | PLAYBACK ORDER OF PRESENT DISC REGARDING DATA IN PRESENT AND FOLLOWING DISCS |
| } | |

VIDEO DATA RECORDING APPARATUS AND METHOD, AND VIDEO DATA REPRODUCING APPARATUS AND METHOD

BACKGROUND OF THE INVENTION

1. Field of the Invention

This invention relates to a method and an apparatus for continuously recording audio visual data on a plurality of recording mediums. In addition, this invention relates to a method and an apparatus for continuously reproducing audio visual data from a plurality of recording mediums.

2. Description of the Related Art

Some video data recording and reproducing apparatuses or recordable video players use recordable DVDs (Digital Versatile Discs) having a diameter of 12 cm. Such DVDs are of a single-layer type and a multi-layer type. A single-layer DVD has only one recording layer. A multi-layer DVD has a plurality of recording layers. Generally, one recording layer in a DVD is about 4.7 GB in recording capacity.

During an SP (Standard Play) mode of recording operation of a recordable video player, audio visual data representing a movie or a television program having a play time of up to about 2 hours can be recorded on one recording layer in a DVD. During the SP mode of recording operation, audio visual data representing a movie or a television program having a play time longer than 2 hours can be recorded on two or more single-layer DVDs.

For example, a first portion of audio visual data representing a movie longer than 2 hours is recorded on a first DVD while a second portion thereof (the rest thereof) is recorded on a second DVD. In this case, information for management of the first portion of the audio visual data is also recorded on the first DVD. Similarly, information for management of the second portion of the audio visual data is also recorded on the second DVD. The information for management of the first portion of the audio visual data is absent from the second DVD while the information for management of the second portion of the audio visual data is absent from the first DVD. Therefore, the information for management of the first portion of the audio visual data can not be obtained by access to the second DVD. The information for management of the second portion of the audio visual data can not be obtained by access to the first DVD. Thus, it tends to be difficult to smoothly and harmoniously manage the whole of the audio visual data recorded on the first and second DVDs.

Japanese patent application publication number 2002-157824 discloses data recording apparatus including a removable optical disc and a large-capacity buffer. The apparatus records a data stream on the optical disc while checking whether or not the remaining usable capacity of the optical disc decreases to a prescribed value in order to decide whether or not the optical disc is substantially fully occupied by recorded data. When the remaining usable capacity of the optical disc decreases to the prescribed value, the apparatus halts the recording of the data stream on the optical disc. As a result, a first portion of the data stream is stored in the optical disc while a second portion thereof which immediately follows the first portion is not. The apparatus stores the second portion of the data stream into the buffer. The apparatus decides whether or not the optical disc is replaced by new one. After the optical disc has been replaced by new one, the apparatus transfers the second portion of the data stream from the buffer onto the new optical disc through processes including a data recording process.

In the apparatus of Japanese application 2002-157824, the data stream may always be written into the buffer before being transferred therefrom onto the optical discs. The apparatus may be equipped with a disc changer for implementing optical-disc replacement.

Japanese patent application publication number 2004-127471 equivalent to United States patent application publication number US 2005/0008346 A1 discloses a data recording apparatus including a disc drive mechanism and a disc changing mechanism. The disc changing mechanism contains a plurality of optical discs, and serves to select one from the optical discs and feed the selected optical disc to the disc drive mechanism. During a continuous recording mode of operation, the apparatus divides a data stream indicative of a television program into portions and records the division-result portions on optical discs respectively.

The apparatus in Japanese application 2004-127471 further includes a recording buffer. During the recording of a data stream on a first optical disc, the apparatus checks whether or not the remaining usable capacity of the first optical disc decreases to a prescribed level or whether or not the remaining recordable time regarding the first optical disc decreases to a prescribed value. When the remaining usable capacity decreases to the prescribed level or when the remaining recordable time decreases to the prescribed value, the apparatus halts the recording of the data stream on the first optical disc. Then, the apparatus replaces the first optical disc with a second optical disc. The apparatus loads the recording buffer with a portion of the data stream which should be recorded during the optical-disc replacement. The apparatus checks whether or not the optical-disc replacement is completed. After the optical-disc replacement is completed, the apparatus reads the portion of the data stream from the recording buffer and then records the read portion on the second optical disc.

In the apparatus of Japanese application 2004-127471, ones can be designated and selected among the optical discs in the disc changing mechanism as objects to be loaded with a data stream indicative of a television program. The designated optical discs are referred to as combination discs. The apparatus generates combination designating information including information for identifying optical discs labeled as combination discs, and information for specifying a recording order in which portions of a data stream should be recorded on the combination discs respectively. The apparatus records such combination designating information on each optical disc as a part of disc management information used for the management of the recording and reproduction of data on and from the optical disc. The disc management information also includes information related to a television program at least partially recorded on the optical disc such as information representing the title of the television program and the date of the recording of the television program.

SUMMARY OF THE INVENTION

It is a first object of this invention to provide an improved apparatus for continuously recording audio visual data on a plurality of recording mediums.

It is a second object of this invention to provide an improved method of continuously recording audio visual data on a plurality of recording mediums.

It is a third object of this invention to provide an improved apparatus for continuously reproducing audio visual data from a plurality of recording mediums.

It is a fourth object of this invention to provide an improved method of continuously reproducing audio visual data from a plurality of recording mediums.

A first aspect of this invention provides a video data recording apparatus comprising means for dividing video data into portions and sequentially recording the video data portions on recording mediums respectively, the recording mediums being removable; means for setting IDs of the respective recording mediums, and IDs of the respective video data portions; means for recording, on first one among the recording mediums, the ID of the first recording medium, the ID of first one among the video data portions which is recorded on the first recording medium, the ID of second one among the recording mediums which follows the first recording medium, and the ID of second one among the video data portions which is recorded on the second recording medium; and means for recording, on last one among the recording mediums, the ID of the last recording medium, the ID of last one among the video data portions which is recorded on the last recording medium, the ID of second last one among the recording mediums which precedes the last recording medium, and the ID of second last one among the video data portions which is recorded on the second last recording medium.

A second aspect of this invention is based on the first aspect thereof, and provides a video data recording apparatus wherein the recording mediums are only the first and last recording mediums, and the second recording medium is the last recording medium while the second last recording medium is the first recording medium.

A third aspect of this invention is based on the second aspect thereof, and provides a video data recording apparatus wherein the recording of the ID of the last recording medium and the ID of the last video data portion on the first recording medium is after the recording of the last data portion on the last recording medium.

A fourth aspect of this invention is based on the first aspect thereof, and provides a video data recording apparatus further comprising means for recording, on intermediate one among the recording mediums, the ID of the intermediate recording medium, the ID of intermediate one among the video data portions which is recorded on the intermediate recording medium, the ID of preceding one among the recording mediums which precedes the intermediate recording medium, the ID of preceding one among the video data portions which is recorded on the preceding recording medium, the ID of following one among the recording mediums which follows the intermediate recording medium, and the ID of following one among the video data portions which is recorded on the following recording medium.

A fifth aspect of this invention is based on the first aspect thereof, and provides a video data recording apparatus further comprising means for setting an ID of the video data, and means for recording the ID of the video data on each of the recording mediums on which the video data portions are recorded respectively.

A sixth aspect of this invention is based on the first aspect thereof, and provides a video data recording apparatus further comprising means for assigning playback order numbers to the video data portions respectively, means for generating information pieces indicative of the assigned playback order numbers respectively, and means for recording the information pieces indicative of the assigned playback order numbers on the recording mediums respectively.

A seventh aspect of this invention is based on the fourth aspect thereof, and provides a video data recording apparatus further comprising means for generating a signal indicative of a representative of pictures represented by each of the video data portions and setting an ID of the generated representative picture signal, and means for recording, on the intermediate recording medium, the representative picture signal for the video data portion recorded on the preceding recording medium, the ID of the representative picture signal for the video data portion recorded on the preceding recording medium, the representative picture signal for the video data portion recorded on the following recording medium, and the ID of the representative picture signal for the video data portion recorded on the following recording medium.

An eighth aspect of this invention provides a video data recording method comprising the steps of dividing video data into portions and sequentially recording the video data portions on recording mediums respectively, the recording mediums being removable; setting IDs of the respective recording mediums, and IDs of the respective video data portions; recording, on first one among the recording mediums, the ID of the first recording medium, the ID of first one among the video data portions which is recorded on the first recording medium, the ID of second one among the recording mediums which follows the first recording medium, and the ID of second one among the video data portions which is recorded on the second recording medium; and recording, on last one among the recording mediums, the ID of the last recording medium, the ID of last one among the video data portions which is recorded on the last recording medium, the ID of second last one among the recording mediums which precedes the last recording medium, and the ID of second last one among the video data portions which is recorded on the second last recording medium.

A ninth aspect of this invention provides a video data reproducing apparatus comprising first means for reading management information from a current recording medium; second means for deciding whether or not the management information read by the first means contains an ID of a preceding recording medium which precedes the current recording medium and an ID of a preceding video data portion recorded on the preceding recording medium; third means for deciding whether or not the management information read by the first means contains an ID of a following recording medium which follows the current recording medium and an ID of a following video data portion recorded on the following recording medium; fourth means for reproducing a current video data portion from the current recording medium in response to intra-disc information in the management information read by the first means in cases where the second means decides that the management information does not contain the ID of the preceding recording medium and the ID of the preceding video data portion and the third mans decides that the management information contains the ID of the following recording medium and the ID of the following video data portion; fifth means for deciding whether or not the reproduction of the current video data portion by the fourth means is close to an end; and sixth means for generating specified information about the following recording medium in response to the ID of the following recording medium and the ID of the following video data portion which are contained in the management information read by the first means, and for indicating the generated specified information when the fifth means decides that the reproduction is close to an end.

A tenth aspect of this invention is based on the ninth aspect thereof, and provides a video data reproducing apparatus further comprising seventh means for reading management information from the preceding recording medium; eighth means for deciding whether or not an ID of the current recording medium and an ID of the current video data portion which are contained in the management information read by the first means are the same as an ID of the current recording medium and an ID of the current video data portion which are contained in the management information read by the seventh means in cases where the second means decides that the management information contains the ID of the preceding recording medium and the ID of the preceding video data portion and the third mans decides that the management information contains the ID of the following recording medium and the ID of the following video data portion; ninth means for reproducing the current video data portion from the current recording medium in response to the intra-disc information in the management information read by the first means in cases where the eighth means decides that an ID of the current recording medium and an ID of the current video data portion which are contained in the management information read by the first means are the same as an ID of the current recording medium and an ID of the current video data portion which are contained in the management information read by the seventh means; tenth means for deciding whether or not the reproduction of the current video data portion by the ninth means is close to an end; and eleventh means for generating specified information about the following recording medium in response to the ID of the following recording medium and the ID of the following video data portion which are contained in the management information read by the first means, and for indicating the generated specified information when the tenth means decides that the reproduction is close to an end.

An eleventh aspect of this invention is based on the ninth aspect thereof, and provides a video data reproducing apparatus further comprising seventh means for reading management information from the preceding recording medium; eighth means for deciding whether or not an ID of the current recording medium and an ID of the current video data portion which are contained in the management information read by the first means are the same as an ID of the current recording medium and an ID of the current video data portion which are contained in the management information read by the seventh means in cases where the second means decides that the management information contains the ID of the preceding recording medium and the ID of the preceding video data portion and the third mans decides that the management information does not contain the ID of the following recording medium and the ID of the following video data portion; and ninth means for reproducing the current video data portion from the current recording medium in response to the intra-disc information in the management information read by the first means in cases where the eighth means decides that an ID of the current recording medium and an ID of the current video data portion which are contained in the management information read by the first means are the same as an ID of the current recording medium and an ID of the current video data portion which are contained in the management information read by the seventh means.

A twelfth aspect of this invention is based on the tenth aspect thereof, and provides a video data reproducing apparatus further comprising means for visually warning that reproduction is not continuous in cases where the eighth means decides that an ID of the current recording medium and an ID of the current video data portion which are contained in the management information read by the first means are not the same as an ID of the current recording medium and an ID of the current video data portion which are contained in the management information read by the seventh means.

A thirteenth aspect of this invention is based on the ninth aspect thereof, and provides a video data reproducing apparatus further comprising seventh means for reading, from the current recording medium, a signal indicating a representative of pictures represented by the current video data portion and at least one of (1) a signal indicating a representative of pictures represented by the preceding video data portion and (2) a signal indicating a representative of pictures represented by the following video data portion; eighth means for visualizing the representatives indicated by the signals read by the seventh means; and ninth means for visualizing a relation in continuance between the representatives visualized by the eighth means in response to an ID of the current recording medium and an ID of the current video data portion which are contained in the management information read by the first means, and in response to one of (1) a set of the ID of the preceding recording medium and the ID of the preceding video data portion and (2) a set of the ID of the following recording medium and the ID of the following video data portion which are contained in the management information read by the first means.

A fourteenth aspect of this invention provides a video data reproducing method comprising the steps of a) reading management information from a current recording medium; b) deciding whether or not the management information read by the step a) contains an ID of a preceding recording medium which precedes the current recording medium and an ID of a preceding video data portion recorded on the preceding recording medium; c) deciding whether or not the management information read by the step a) contains an ID of a following recording medium which follows the current recording medium and an ID of a following video data portion recorded on the following recording medium; d) reproducing a current video data portion from the current recording medium in response to intra-disc information in the management information read by the step a) in cases where the step b) decides that the management information does not contain the ID of the preceding recording medium and the ID of the preceding video data portion and the step c) decides that the management information contains the ID of the following recording medium and the ID of the following video data portion; e) deciding whether or not the reproduction of the current video data portion by the step d) is close to an end; and f) generating specified information about the following recording medium in response to the ID of the following recording medium and the ID of the following video data portion which are contained in the management information read by the step a), and for indicating the generated specified information when the step e) decides that the reproduction is close to an end.

A fifteenth aspect of this invention is based on the fourteenth aspect thereof, and provides a video data reproducing apparatus further comprising the steps of g) reading management information from the preceding recording medium; h) deciding whether or not an ID of the current recording medium and an ID of the current video data portion which are contained in the management information read by the step a) are the same as an ID of the current recording medium and an ID of the current video data portion which are contained in the management information read by the step g) in cases where the step b) decides that the management information contains the ID of the preceding recording medium and the ID of the preceding video data portion and the step c) decides that the management information contains the ID of the following recording medium and the ID of the following video data portion; i) reproducing the current video data portion from the current recording medium in response to the intra-disc information in the management information read by the step a) in cases where the step h) decides that an ID of the current recording medium and an ID of the current video data portion which are contained in the management information read by the step a) are the same as an ID of the current recording medium and an ID of the current video data portion which are contained in the management information read by the step g); j) deciding whether or not the reproduction of the current video data portion by the step i) is close to an end; and k) generating specified information about the following recording medium in response to the ID of the following recording medium and the ID of the following video data portion which are contained in the management information read by the step a), and for indicating the generated specified information when the step j) decides that the reproduction is close to an end.

A sixteenth aspect of this invention is based on the fourteenth aspect thereof, and provides a video data reproducing method further comprising the steps of g) reading management information from the preceding recording medium; h) deciding whether or not an ID of the current recording medium and an ID of the current video data portion which are contained in the management information read by the step a) are the same as an ID of the current recording medium and an ID of the current video data portion which are contained in the management information read by the step g) in cases where the step b) decides that the management information contains the ID of the preceding recording medium and the ID of the preceding video data portion and the step c) decides that the management information does not contain the ID of the following recording medium and the ID of the following video data portion; and i) reproducing the current video data portion from the current recording medium in response to the intra-disc information in the management information read by the step a) in cases where the step h) decides that an ID of the current recording medium and an ID of the current video data portion which are contained in the management information read by the step a) are the same as an ID of the current recording medium and an ID of the current video data portion which are contained in the management information read by the step g).

A seventeenth aspect of this invention is based on the fourteenth aspect thereof, and provides a video data reproducing method further comprising the steps of g) reading, from the current recording medium, a signal indicating a representative of pictures represented by the current video data portion and at least one of (1) a signal indicating a representative of pictures represented by the preceding video data portion and (2) a signal indicating a representative of pictures represented by the following video data portion; h) visualizing the representatives indicated by the signals read by the step g); and i) visualizing a relation in continuance between the representatives visualized by the step h) in response to an ID of the current recording medium and an ID of the current video data portion which are contained in the management information read by the step a), and in response to one of (1) a set of the ID of the preceding recording medium and the ID of the preceding video data portion and (2) a set of the ID of the following recording medium and the ID of the following video data portion which are contained in the management information read by the step a).

This invention has the following advantage. It is possible to easily grasp the relation among a plurality of recording mediums used for continuously recording audio visual data, and the relation among portions of the audio visual data which are recorded on the recording mediums respectively.

BRIEF DESCRIPTION OF THE DRAWINGS

FIG. 4 is a diagram showing an example of a table-like version of inter-disc management information.

FIG. 5 is a diagram showing an example of the first continuous recording of audio visual data on two optical discs and the second continuous recording of audio visual data on two optical discs among three optical discs.

FIG. 6 is a diagram showing an example of the continuous recording of audio visual data on three optical discs.

FIG. 7 is a diagram showing an example of a table-like version of inter-disc management information assigned to first one of optical discs used for the continuous recording of audio visual data.

FIG. 8 is a diagram showing an example of a table-like version of inter-disc management information assigned to second one of the optical discs used for the continuous recording of audio visual data.

FIG. 9 is a diagram showing an example of a table-like version of inter-disc management information resulting from updating the inter-disc management information in FIG. 7.

FIG. 10 is a diagram showing an example of a syntax-based version of inter-disc management information.

FIG. 19 shows an example of a syntax-based version of inter-disc management information in a fourth embodiment of this invention.

DETAILED DESCRIPTION OF THE INVENTION

First Embodiment

Figure 1:
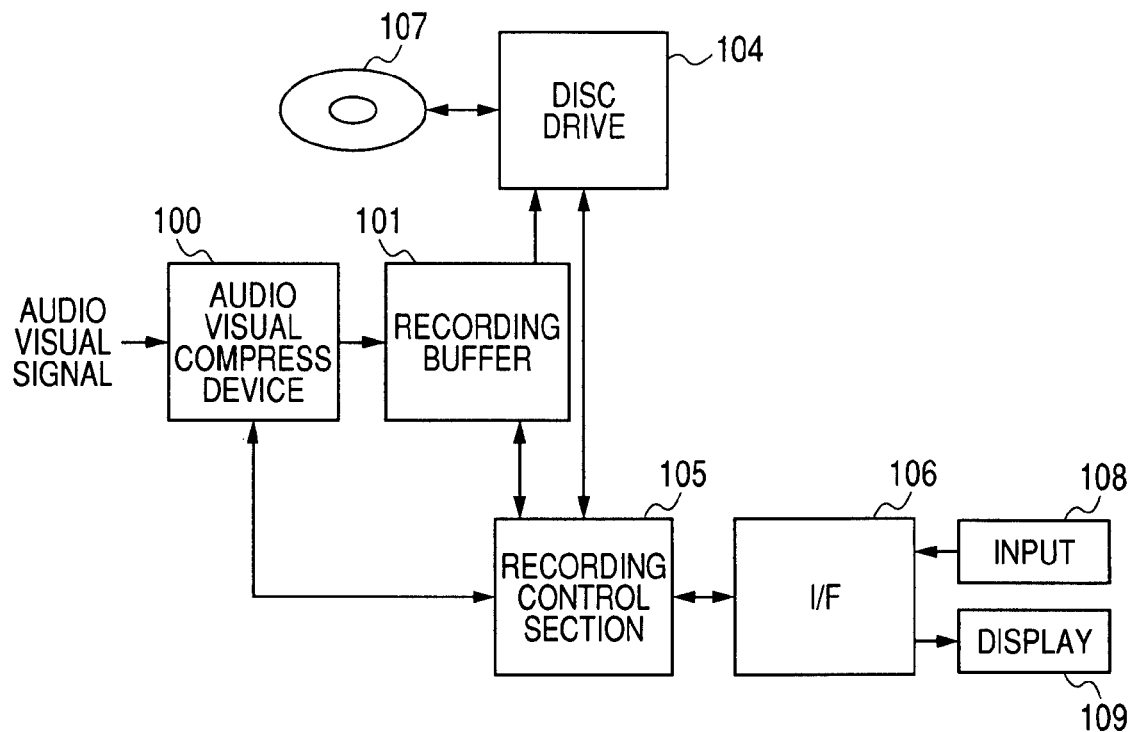
FIG. 1 is a block diagram of a video data recording apparatus according to a first embodiment of this invention.

FIG. 1 shows a video data recording apparatus according to a first embodiment of this invention. The apparatus of FIG. 1 includes an audio visual compression device (an audio visual encoding device) 100, a recording buffer 101, a disc drive 104, a recording control section 105, an interface (I/F) 106, an input device 108, and a display 109.

Preferably, the recording buffer 101 is a combination of a hard disc and a drive therefor, or a nonvolatile memory. The recording buffer 101 has a predetermined large capacity.

The disc drive 104 is designed for a removable optical disc 107. It should be noted that a combination of the optical disc 107 and the disc drive 104 may be replaced by a removable memory or a removable hard disc drive unit.

Preferably, the recording control section 105 includes a computer having a combination of an input/output port, a CPU, a ROM, and a RAM. In this case, the recording control section 105 operates in accordance with a control program (a computer program) stored in the ROM or the RAM. The control program is designed to enable the recording control section 105 to implement actions indicated hereafter.

The audio visual compression device (the audio visual encoding device) 100 receives an input audio visual signal, and compresses the received audio visual signal to get a compressed audio visual signal while being controlled by the recording control section 105. It should be noted that the input audio visual signal may be replaced by a video signal exclusive of audio components. The audio visual compression device 100 feeds the compressed audio visual signal to the recording buffer 101 under the control by the recording control section 105. The recording buffer 101 temporarily stores the compressed audio visual signal while being controlled by the recording control section 105. The recording buffer 101 outputs the compressed audio visual signal to the disc drive 104 under the control by the recording control section 105. The disc drive 104 records the compressed audio visual signal on a predetermined audio visual data recording area in the optical disc 107 while being controlled by the recording control section 105.

A user can input control commands into the apparatus by actuating, for example, buttons on the input device 108. The input device 108 may include a remote control device. Examples of the control commands are a command to start recording, a command to stop recording, and a command to eject an optical disc 107 from the apparatus (the disc drive 104). The interface 106 sends the inputted control commands to the recording control section 105. The recording control section 105 receives the control commands as control information. The recording control section 105 controls the audio visual compression device 100, the recording buffer 101, and the disc drive 104 in response to the control information, thereby implementing signal recording on the optical disc 107.

Preferably, the apparatus of FIG. 1 is designed to accommodate only one optical disc 107. The user can replace the optical disc 107 in the apparatus with new one. The apparatus does not have an automatic disc changer or a mechanism for simultaneously loading a plurality of optical discs into disc drives.

As will be explained hereafter, the apparatus of FIG. 1 can record, on a plurality of optical discs 107, audio visual data representing a television program or a movie having a relatively long play time.

The disc drive 104 includes a sensor for detecting whether or not an optical disc 107 is set in position with respect to the disc-drive body. The sensor informs the recording control section 105 when an optical disc 107 is set in position with respect to the disc-drive body. The user can input control commands into the apparatus by actuating the input device 108. The interface 106 sends the inputted control commands to the recording control section 105.

In the case where the recording control section 105 receives user's command to start recording after being informed that a first optical disc 107 is set in the optical disc 104, the recording control section 105 starts controlling the audio visual compression device 100, the recording buffer 101, and the disc drive 104 as follows.

The recording control section 105 controls the audio visual compression device 100 to subject input audio visual data (an input audio visual signal) to compressively encoding such as MPEG encoding to get compressively-encoded audio visual data. The audio visual compression device 100 outputs the compressively-encoded audio visual data in the form of a bit stream to the recording buffer 101.

The recording control section 105 controls the recording buffer 101 so that an audio visual data recording area in the recording buffer 101 will temporarily store the compressively-encoded audio visual data.

The recording control section 105 generates control information with respect to audio visual data recorded for every single-time recording operation. The generated control information is designed to identify and manage the related audio visual data. The control information has a piece representing the name or title of the contents of the audio visual data, and an identifier for the audio visual data. The recording control section 105 temporarily stores the control information in a control information recording area in the recording buffer 101 which is separate from the audio visual data recording area therein.

Figure 2:
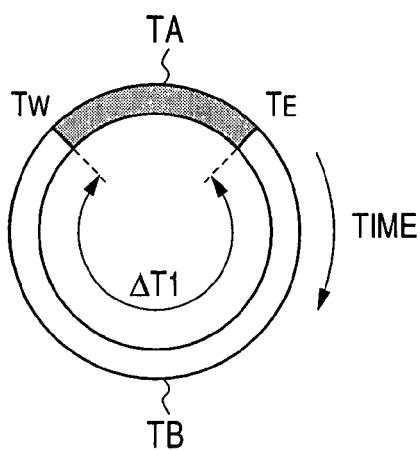
FIG. 2 is a diagram showing a virtual expression of an audio visual data recording area in a recording buffer in FIG. 1.

As shown in FIG. 2, the audio visual data recording area in the recording buffer 101 is virtually in the form of a ring. The compressively-encoded audio visual data is recorded on the audio visual data recording area along the clockwise direction in accordance with the lapse of time. The amount of the audio visual data in the audio visual data recording area is maintained at a value corresponding to a prescribed grace time interval which is assumed to be taken by the user to carry out optical-disc replacement. The prescribed grace time interval is equal to, for example, about 30 seconds. After temporarily stored in the audio visual data recording area in the recording buffer 101, the compressively-encoded audio visual data is moved therefrom to the disc drive 104 and is then recorded on the optical disc 107 by the disc drive 104.

In FIG. 2, the reference character "TE" denotes the newest position on the audio visual data recording area in the recording buffer 101 at which the audio visual data outputted from the audio visual compression device 100 is currently recorded. The reference character "TW" denotes the position on the audio visual data recording area in the recording buffer 101 at which the recorded audio visual data is currently transferred toward the disc drive 104. Accordingly, the audio visual data which has not been recorded on the optical disc 107 yet is present in the recording-area portion TA extending from the position TW to the position TE as viewed in the direction of the lapse of time. On the other hand, the audio visual data which has already been recorded on the optical disc 107 is present in the recording-area portion TB extending from the position TE to the position TW as viewed in the direction of the lapse of time. Thus, the audio visual data outputted from the audio visual compression device 100 is allowed to be written over the audio visual data in the recording-area portion TB.

During the recording of audio visual data on an audio visual data recording area of the optical disc 107 by the disc drive 104, the recording control section 105 detects or calculates the remaining usable capacity of the audio visual data recording area of the optical disc 107 in a known way. In other words, the recording control section 105 monitors the remaining usable capacity of the audio visual data recording area of the optical disc 107. Furthermore, the recording control section 105 decides whether or not the remaining usable capacity of the audio visual data recording area of the optical disc 107 substantially becomes zero, that is, whether or not the remaining usable portion substantially disappears from the audio visual data recording area of the optical disc 107.

In the case where audio visual data is being recorded on the audio visual data recording area of the optical disc 107 through the recording buffer 101 and the disc drive 104, when the recording control section 105 detects that the remaining usable portion substantially disappears from the audio visual data recording area of the optical disc 107 or when the recording control section 105 receives user's command to eject the optical disc 107 from the disc drive 104, the recording control section 105 controls the disc drive 104 to suspend the recording of the audio visual data on the audio visual data recording area of the optical disc 107. At this time, the recording control section 105 controls the recording buffer 101 to suspend the transfer of the audio visual data from the recording buffer 101 toward the disc drive 104. Thus, the position TW stops. Furthermore, the recording control section 105 generates inter-disc management information and intra-disc management information, and controls the recording buffer 101 to store the inter-disc management information and the intra-disc management information. In addition, the recording control section 105 controls the recording buffer 101 and the disc drive 104 to record the inter-disc management information and the intra-disc management information on a management information recording area in the optical disc 107 which is separate from the audio visual data recording area therein.

The intra-disc management information is known management information indicating, for example, addresses for managing the recording and reproduction of audio visual data on and from the optical disc 107. On the other hand, the inter-disc management information is novel. The inter-disc management information applies to cases where audio visual data representing one audio visual sequence or one continuous content (for example, one movie or one television program) is divided into portions recorded on respective optical discs 107. The inter-disc management information represents the order in which the audio visual data is sequentially recorded on the optical discs, the relation among the optical discs, the order in which the portions of the audio visual data are arranged, and the relation among the portions of the audio visual data.

Even when the recording control section 105 controls the disc drive 104 to suspend the recording of the audio visual data on the audio visual data recording area of the optical disc 107, the audio visual compression device 100 continues to subject the input audio visual data to compressively encoding to get compressively-encoded audio visual data. The audio visual compression device 100 keeps outputting the compressively-encoded audio visual data to the recording buffer 101. The recording control section 105 controls the recording buffer 101 so that the compressively-encoded audio visual data will continue to be stored in the recording buffer 101. Thus, the position TE keeps moving clockwise in accordance with the lapse of time while the position TW remains stationary.

The recording control section 105 generates a signal representing an announcement picture for urging the user to eject the fully-used optical disc 107 from the disc drive 104 and then set a new optical disc 107 (that is, a next optical disc 107) therein. The next optical disc 107 is the last one or an intermediate one between the first optical disc 107 and the last optical disc 107. The recording control section 105 sends the signal of the announcement picture to the display 109 via the interface 106. The display 109 presents the announcement picture to the user. Usually, the user replaces the fully-used optical disc 107 with the next one in response to the presented announcement picture.

When the user carries out optical-disc replacement, the sensor in the disc drive 104 informs the recording control section 105 that a new optical disc (a second optical disc) 107 is set in the disc drive 104 or that optical-disc replacement has been completed. In response to this information from the sensor, the recording control section 105 restarts controlling the recording buffer 101 and the disc drive 104 to implement the transfer of the audio visual data from the recording buffer 101 to the disc drive 104 and the recording of the audio visual data on the new optical disc 107.

In the case where the user carries out optical-disc replacement in the interval $\Delta T1$ (see FIG. 2) corresponding to the recording-area portion TB, the transfer of the audio visual data from the recording buffer 101 toward the disc drive 104 is restarted at the position TW and the transferred audio visual data is recorded on the new optical disc (the second optical disc) 107. Therefore, the audio visual data is continuously recorded on the two optical discs 107 without being broken.

Preferably, the recording control section 105 decides whether or not optical-disc replacement fails to be completed in the interval $\Delta T1$. When optical-disc replacement fails to be completed in the interval $\Delta T1$, the recording control section 105 controls the audio visual compression device 100 to suspend the compressively encoding to stop the position TE and prevent the audio visual data outputted by the audio visual compression device 100 from being written over the audio visual data in the recording-area portion TA which has not been recorded on an optical disc 107 yet.

Figure 3:
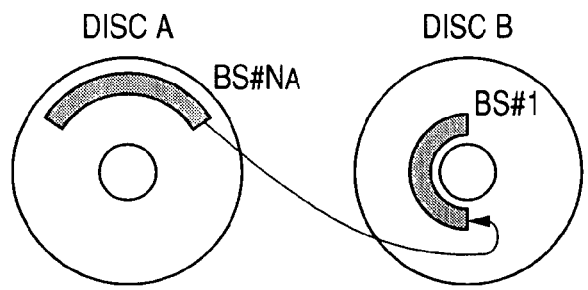
FIG. 3 is a diagram showing an example of the continuous recording of audio visual data on two optical discs.

FIG. 3 shows conditions where audio visual data is continuously recorded on optical discs "A" and "B" in that order. The optical disc "A" is the first one while the optical disc "B" is the last one. Intra-disc management information is generated for each of the optical discs "A" and "B". The intra-disc management information for the optical disc "A" is designed for the management of all audio visual data in the optical disc "A" which includes the above-mentioned audio visual data and other audio visual data. Similarly, the intra-disc management information for the optical disc "B" is designed for the management of all audio visual data in the optical disc "B" which includes the above-mentioned audio visual data and other audio visual data.

In FIG. 3, data identification information (data ID) for audio visual data last recorded on the optical disc "A" is denoted by "BS#NA", where "NA" indicates an integer equal to or greater than "1". Data ID for audio visual data first recorded on the optical disc "B" is denoted by "BS#1". The continuous recording of audio visual data is implemented from "BS#NA" on the optical disc "A" to "BS#1" on the optical disc "B". After the recording of audio visual data having the data ID "BS#1" on the optical disc "B", the recording is stopped.

In the case where optical-disc replacement is carried out for the continuous recording of audio visual data representing one audio visual sequence or one content (for example, one movie or one television program) on the optical discs "A" and "B", the apparatus of FIG. 1 stops the recording of the audio visual data on the optical disc "A" before the optical disc "A" is ejected therefrom. The apparatus generates inter-disc management information for the management of the continuous recording on the optical discs "A" and "B". The inter-disc management information relates to recording conditions occurring in the time interval from the moment of the stop of the recording of the audio visual data on the optical disc "A" to the moment of the start of the recoding of the audio visual data on the optical disc "B". The apparatus records the inter-disc management information on the optical disc "A". In addition, the apparatus generates intra-disc management information for the management of all audio visual data in the optical disc "A". The apparatus records the intra-disc management information on the optical disc "A". Specifically, in the apparatus, the recording control section 105 generates the inter-disc management information and the intra-disc management information. The recording control section 105 temporarily stores the inter-disc management information and the intra-disc management information in the control information recording area in the recording buffer 101. The recording control section 105 controls the recording buffer 101 and the disc drive 104 to transfer the inter-disc management information and the intra-disc management information from the recording buffer 101 to the disc drive 104 and then record the inter-disc management information and the intra-disc management information on the management information recording area in the optical disc "A". Preferably, the inter-disc management information remains stored in the recording buffer 101 until the continuous recording is completed and the first optical disc (the optical disc "A") is set in the disc drive 104 again, and then information about the last optical disc (the optical disc "B") is recorded on the first optical disc to update the inter-disc management information for the first optical disc.

FIG. 4 shows an example of a table-like version of inter-disc management information. Inter-disc management information is assigned to each of optical discs 107 used for the continuous recording of audio visual data. Identification information (disc ID) is decided for and assigned to each of the optical discs 107. Identification information (data ID) is decided for and assigned to each of portions of the audio visual data which are recorded on the optical discs 107 respectively. Disc ID of an optical disc 107 of interest is a first parameter (present or current disc ID) in the inter-disc management information for the optical disc 107 of interest. Disc ID of an optical disc 107 immediately preceding the optical disc 107 of interest as viewed in the direction of the continuous recording is a second parameter (preceding disc ID) in the inter-disc management information for the optical disc 107 of interest. Disc ID of an optical disc 107 immediately following the optical disc 107 of interest as viewed in the direction of the continuous recording is a third parameter (following disc ID) in the inter-disc management information for the optical disc 107 of interest. Data ID of an audio visual data portion recorded on the optical disc 107 of interest is a fourth parameter in the inter-disc management information for the optical disc 107 of interest. Data ID of an audio visual data portion recorded on the optical disc 107 immediately preceding the optical disc 107 of interest is a fifth parameter in the inter-disc management information for the optical disc 107 of interest. Data ID of an audio visual data portion recorded on the optical disc 107 immediately following the optical disc 107 of interest is a sixth parameter in the inter-disc management information for the optical disc 107 of interest.

Sequence identification information (sequence ID) for identifying the continuously-recorded audio visual data is a seventh parameter in the inter-disc management information. Playback order information representing the order in which the continuously-recorded audio visual data should be reproduced from related optical discs 107 is an eighth parameter in the inter-disc management information. It should be noted that the sequence ID and the playback order information may be omitted from the inter-disc management information.

In FIG. 4, each cell with the character "-" therein denotes the absence of a recorded data piece, and a blank cell denotes that a signal of "0" is recorded therein. A signal of "0" is not used for disc IDs and data IDs.

FIG. 5 shows conditions where audio visual data representing one audio visual sequence or one content is continuously recorded on optical discs "A" and "B" in that order, and audio visual data representing another audio visual sequence or another content is continuously recorded on optical discs "B" and "C" in that order. FIG. 6 shows conditions where audio visual data representing one audio visual sequence or one content is continuously recorded on optical discs "A", "B", and "C" in that order. The optical discs "A", "B", and "C" are the first one, the intermediate one, and the last one, respectively. It should be noted that there may be two or more intermediate optical discs.

In the case of the continuous recording of audio visual data on two recording discs "A" and "B" (see FIG. 3), when the recording control section 105 detects that the remaining usable portion substantially disappears from the audio visual data recording area of the optical disc "A" or when the recording control section 105 receives user's command to eject the optical disc "A" from the disc drive 104, the recording control section 105 controls the disc drive 104 to suspend the recording of the audio visual data on the audio visual data recording area of the optical disc "A". At this time, the recording control section 105 generates inter-disc management information and intra-disc management information, and controls the recording buffer 101 and the disc drive 104 to record the inter-disc management information and the intra-disc management information on the management information recording area in the optical disc "A".

FIG. 7 shows an example of the inter-disc management information generated by the recording control section 105 and recorded on the optical disc "A". With reference to FIG. 7, the recording control section 105 sets the disc ID of the optical disc "A" to "DIDA", and sets the data ID of an audio visual data portion in the optical disc "A" to "BS#NA". The recording control section 105 assigns "SID1" to the sequence ID of audio visual data sequentially recorded on the optical discs "A" and "B". The recording control section 105 sets playback order information to "1". Before optical-disc replacement, the ID of the optical disc "B" and the data ID of an audio visual data portion in the optical disc "B" are indefinite to the recording control section 105. Thus, in this case, the recording control section 105 can not accurately set parameters in the inter-disc management information which relate to the next optical disc (the optical disc "B"). Accordingly, the recording control section 105 provisionally sets the disc ID of the next optical disc and the data ID of an audio visual data portion in the next optical disc to "NEXT" indicative of continuous recording on a plurality of optical discs. Alternatively, the recording control section 105 may provisionally set one of the disc ID of the next optical disc and the data ID of an audio visual data portion in the next optical disc to "NEXT". Regarding the continuous recording of audio visual data on the optical discs "A" and "B", the optical disc "A" is the first one so that an optical disc preceding the optical disc "A" is absent. Accordingly, the disc ID of a preceding optical disc and the data ID of an audio visual data portion in a preceding optical disc remain undecided in the inter-disc management information for the optical disc "A".

In the case where the optical disc "A" is ejected from the apparatus of FIG. 1 and is then set therein again, the apparatus reproduces the inter-disc management information from the optical disc "A". The disc ID of a preceding optical disc and the data ID of an audio visual data portion in the preceding optical disc are absent from the reproduced inter-disc management information. According to this fact, the apparatus decides that the optical disc "A" is the first one among optical discs used for the continuous recording of audio visual data.

As previously mentioned, the inter-disc management information for the optical disc "A" is stored in the recording buffer 101. The inter-disc management information for the optical disc "A" is copied from the recording buffer 101 onto the optical disc "A". In other words, the inter-disc management information for the optical disc "A" is recorded on the optical disc "A". The original inter-disc management information for the optical disc "A" remains stored and saved in the recording buffer 101.

When the recording control section 105 detects that the optical disc "A" is ejected from the disc drive 104 and the optical disc "B" is set therein, the recording control section 105 assigns "DIDB" to the disc ID of the optical disc "B" and sets the present disc ID "DIDB" as a parameter in inter-disc management information for the optical disc "B". In addition, the recording control section 105 assigns "BS#1" to the data ID of an audio visual data portion to be recorded on the optical disc "B" which immediately follows the audio visual data portion "BS#NA" in the optical disc "A". The recording control section 105 sets the present data ID "BS#1" as a parameter in the inter-disc management information for the optical disc "B". The recording control section 105 sets the sequence ID "SID1" as a parameter in the inter-disc management information for the optical disc "B". The sequence ID "SID1" is the same as that in the inter-disc management information recorded on the optical disc "A". The recording control section 105 assigns "2" to playback order information, and sets the playback order information "2" as a parameter in the inter-disc management information for the optical disc "B". The recording control section 105 sets the disc ID "DIDA" of the optical disc "A" as a preceding disc ID in the inter-disc management information for the optical disc "B". The recording control section 105 sets the data ID "BS#NA" of the audio visual data portion in the optical disc "A" as a preceding data ID in the inter-disc management information for the optical disc "B". Thus, the recording control section 105 generates the inter-disc management information for the optical disc "B" which assumes a state such as shown in FIG. 8. The recording control section 105 stores the inter-disc management information for the optical disc "B" in the recording buffer 101. It should be noted that the sequence ID and the playback order information may be omitted from the inter-disc management information for the optical disc "B". Regarding the continuous recording of audio visual data on the optical discs "A" and "B", the optical disc "B" is the last one so that an optical disc following the optical disc "B" is absent. Accordingly, the disc ID of a following optical disc and the data ID of an audio visual data portion in the following optical disc remain undecided in the inter-disc management information for the optical disc "B".

When the recording of the visual audio data portion "BS#1" on the optical disc "B" is completed, the recording control section 105 controls the recording buffer 101 and the disc drive 104 to record the inter-disc management information for the optical disc "B" on the management information recording area in the optical disc "B". The original inter-disc management information for the optical disc "B" remains in the recording buffer 101.

In the case where the optical disc "B" is ejected from the apparatus of FIG. 1 and is then set therein again, the apparatus reproduces the inter-disc management information from the optical disc "B". The disc ID of a following optical disc and the data ID of an audio visual data portion in the following optical disc are absent from the reproduced inter-disc management information. According to this fact, the apparatus decides that the optical disc "B" is the last one among optical discs used for the continuous recording of audio visual data.

In the case where the optical disc "B" is ejected from the disc drive 104 and the optical disc "A" is set therein again after the recording of the audio visual data portion "BS#1" on the optical disc "B" ends, the recording control section 105 updates or completes the inter-disc management information for the optical disc "A" by referring to the inter-disc management information for the optical disc "B". Specifically, when the optical disc "A" is set in the disc drive 104 again, the recording control section 105 controls the disc drive 104 to reproduce the inter-disc management information from the optical disc "A". The recording control section 105 receives the reproduced inter-disc management information from the disc drive 104. The recording control section 105 compares the present disc ID in the reproduced inter-disc management information and the present disc ID in the original inter-disc management information for the optical disc "A" in the recording buffer 101. According to the result of the disc ID comparison and the reproduced inter-disc management information, the recording control section 105 decides whether or not the optical disc "A" precedes the optical disc "B" and is the first one among optical discs used for the continuous recording of audio visual data having the same sequence ID. When it is decided that the optical disc "A" precedes the optical disc "B" and is the first one, the recording control section 105 accesses the inter-disc management information for the optical disc "B" in the recording buffer 101 and writes the disc ID "DIDB" and the data ID "BS#1" of the accessed inter-disc management information over the inter-disc management information for the optical disc "A" in the recording buffer 101 as following disc ID and data ID of an audio visual data portion in a following optical disc. Thus, the inter-disc management information for the optical disc "A" in the recording buffer 101 is updated. The recording control section 105 controls the recording buffer 101 and the disc drive 104 to record the updated inter-disc management information for the optical disc "A" over the old one in the management information recording area in the optical disc "A".

FIG. 9 shows an example of the updated inter-disc management information recorded on the optical disc "A". With reference to FIGS. 7 and 9, the disc ID of a following optical disc is changed from "NEXT" to "DIDB" (the disc ID of the optical disc "B"). The data ID of an audio visual data portion in a following optical disc is changed from "NEXT" to "BS#1" (the data ID of the audio visual data portion in the optical disc "B"). Regarding the continuous recording of audio visual data on the optical discs "A" and "B", the optical disc "A" is the first one so that an optical disc preceding the optical disc "A" is absent. Accordingly, the disc ID of a preceding optical disc and the data ID of an audio visual data portion in the preceding optical disc remain undecided in the updated inter-disc management information for the optical disc "A". Thus, when the updated inter-disc management information is reproduced from the optical disc "A", the disc ID of a preceding optical disc and the data ID of an audio visual data portion in the preceding optical disc are absent from the reproduced inter-disc management information. According to this fact, the apparatus decides that the optical disc "A" is the first one among optical discs used for the continuous recording of audio visual data.

As previously mentioned, regarding the continuous recording of audio visual data on a plurality of optical discs, the apparatus of FIG. 1 generates inter-disc management information for each of the optical discs and records the inter-disc management information thereon. Inter-disc management information for an optical disc of interest indicates the disc ID of the optical disc of interest, the data ID of an audio visual data portion in the optical disc of interest, the disc ID of an optical disc preceding the optical disc of interest, the data ID of an audio visual data portion in the optical disc preceding the optical disc of interest, the disc ID of an optical disc following the optical disc of interest, and the data ID of an audio visual data portion in the optical disc following the optical disc of interest. Thus, inter-disc management information in the optical discs represents the relation among the optical discs in the sequential recording of audio visual data, and the relation among the portions of the audio visual data in the respective optical discs. Accordingly, by referring to inter-disc management information in the optical discs, it is possible to recognize the relation among the optical discs in the sequential recording of audio visual data, and the relation among the portions of the audio visual data in the respective optical discs.

According to a first example, disc ID for each optical disc 107 includes unique information which is recorded on the optical disc 107 by a disc manufacturer at the time of shipping the optical disc 107. According to a second example, when the disc drive 104 detects that an optical disc 107 set therein is virgin, the disc drive 104 or the recording control section 105 assigns unique disc ID to the optical disc 107. The disc drive 104 records the assigned unique disc ID on the optical disc 107. According to a third example, disc ID for each optical disc 107 includes at least one of (1) information representing a manufacturer ID number of the disc drive 104, (2) information representing a serial number of the disc drive 104, (3) unique information owned by the disc drive 104, (4) information representing a random number generated in the apparatus of FIG. 1, and (5) information representing the date and time of the start of recording. According to a fourth example, a nonvolatile memory is provided in the apparatus of FIG. 1, and the apparatus assigns a unique ID number to an optical disc 107 set therein when detecting that the optical disc 107 is virgin. In the fourth example, the apparatus stores the assigned unique ID number in the nonvolatile memory and generates disc ID by combining the stored unique ID number with at least one of (1) information representing a manufacturer ID number of the disc drive 104, (2) information representing a serial number of the disc drive 104, (3) unique information owned by the disc drive 104, (4) information representing a random number generated in the apparatus, and (5) information representing the date and time of the start of recording. In this way, different disc IDs are assigned to optical discs 107 respectively.

It is assumed that the second optical disc 107 which should replace the first optical disc 107 is virgin. In this case, the following actions may be performed. Before the first optical disc 107 is ejected from the disc drive 104, disc ID different from that of the first optical disc 107 is assigned to the second optical disc 107 in one of the previously-mentioned ways. Furthermore, data ID of an audio visual data portion to be recorded on the second optical disc 107 is previously set to "BS#1". Then, the disc ID of the second optical disc 107 and the data ID "BS#1" are written into the inter-disc management information in the first optical disc 107 as disc ID of a following optical disc and data ID of an audio visual data portion recorded on the following optical disc. When the second optical disc 107 is set in the disc drive 104, inter-disc management information indicating the assigned disc ID and the data ID "BS#1" is recorded on the second optical disc 107. Accordingly, it is unnecessary to set the first optical disc 107 in the disc drive 104 again to update the inter-disc management information in the first optical disc 107 after the recording of an audio visual data portion on the first optical disc 107 ends and then the first optical disc 107 is ejected from the disc drive 104. Thus, optical discs 107 used for the continuous recording of audio visual data can easily be managed.

FIG. 10 shows an example of a syntax-based version of inter-disc management information. With reference to FIG. 10, a parameter group "manageInfoAmongDiscs( )" is defined as inter-disc management information. The parameter group "manageInfoAmongDiscs( )", that is, the inter-disc management information, is recorded on an optical disc 107 and is stored in the recording buffer 101. The parameter group "manageInfoAmongDiscs( )" has parameters corresponding to those in FIGS. 4, and 7-9. The inter-disc management information is designed to have a syntax in which 11 parameters are arranged in a prescribed order. Each of the 11 parameters is assigned 8 bytes. Thus, the inter-disc management information has 88 bytes in total.

In FIG. 10, a parameter "current_disc_ID" is disc ID of an optical disc 107 currently set in the disc drive 104 and subjected to data recording, and a parameter "previous_disc_ID" is disc ID of an optical disc immediately preceding the current optical disc as viewed in the direction of the continuous recording of audio visual data on a plurality of optical discs. A parameter "previous_data_ID" is data ID of an audio visual data portion recorded on the optical disc immediately preceding the current optical disc. A parameter "current_data_ID1" is data ID of an audio visual data portion recorded on the current optical disc and continuously following the audio visual data portion identified by the parameter "previous_data_ID". A parameter "sequence_ID1" is sequence ID (identification information) for audio visual data recorded on the preceding and current optical discs. A parameter "play_order1" is a playback order number of the current optical disc in playback of audio visual data from the preceding and current optical discs. A parameter "next_ID" is disc ID of an optical disc immediately following the current optical disc as viewed in the direction of the continuous recording of audio visual data on a plurality of optical discs. A parameter "next_data_ID" is data ID of an audio visual data portion recorded on the optical disc immediately following the current optical disc. A parameter "current_data_ID2" is data ID of an audio visual data portion recorded on the current optical disc and continuously preceding the audio visual data identified by the parameter "next_data_ID". A parameter "sequence_ID2" is sequence ID (identification information) for audio visual data recorded on the current and following optical discs. A parameter "play_order2" is a playback order number of the current optical disc in playback of audio visual data from the current and following optical discs.

In the absence of an optical disc preceding the current optical disc regarding the continuous recording of audio visual data on a plurality of optical discs, a signal of "0" is set in each of the parameters "previous_disc_ID", "previous_data_ID", "current_data_ID1", "sequence_ID1", and "play_order1". In the absence of an optical disc following the current optical disc regarding the continuous recording of audio visual data on a plurality of optical discs, a signal of "0" is set in each of the parameters "next_ID", "next_data_ID", "current_data_ID2", "sequence_ID2", and "play_order2". Disc IDs of optical discs and data IDs of audio visual data portions in the optical discs are selected among words different from a signal of "0".

Audio visual data having one audio visual sequence or one content (for example, one movie or one television program) can be continuously recorded on three or more optical discs similarly to the above-mentioned continuous recording of audio visual data on two optical discs.

The apparatus of FIG. 1 is provided in, for example, a video camera which has the function of recording captured-image/sound data on an optical disc such as a DVD or a Blu-ray disc. In this case, the apparatus can record captured-image/sound data on a plurality of optical discs as continuous data.

The apparatus in the video camera operates as follows. During the recording of captured-image/sound data on a current optical disc 107, the apparatus monitors the remaining usable capacity of the current optical disc 107 and decides whether or not the remaining usable capacity of the current optical disc 107 substantially disappears. When the remaining usable capacity of the current optical disc 107 substantially disappears, the apparatus starts recording the captured-image/sound data on a next optical disc 107 to allow the continuous recording of the captured-image/sound data on the plural optical discs 107 without a break. Specifically, even when the remaining usable capacity of the current optical disc 107 substantially disappears, the captured-image/sound data continues to be stored in the recording buffer 101. The current optical disc 107 is replaced with a next optical disc 107 in a time interval from the moment of the end of the recording of the captured-image/sound data on the current optical disc 107 to the moment when the captured-image/sound data in the recording buffer 101 which has not been recorded on an optical disc 107 yet starts to be deleted by overwrite. Then, the captured-image/sound data is transferred from the recording buffer 101 to the disc drive 104 and is recorded on the next optical disc 107 by the disc drive 104 so that the captured-image/sound data can be continuously recorded on the current and next optical discs 107 without being broken. The recording buffer 101 is, for example, a memory or a combination of a hard disc and a drive therefor.

Figure 11:
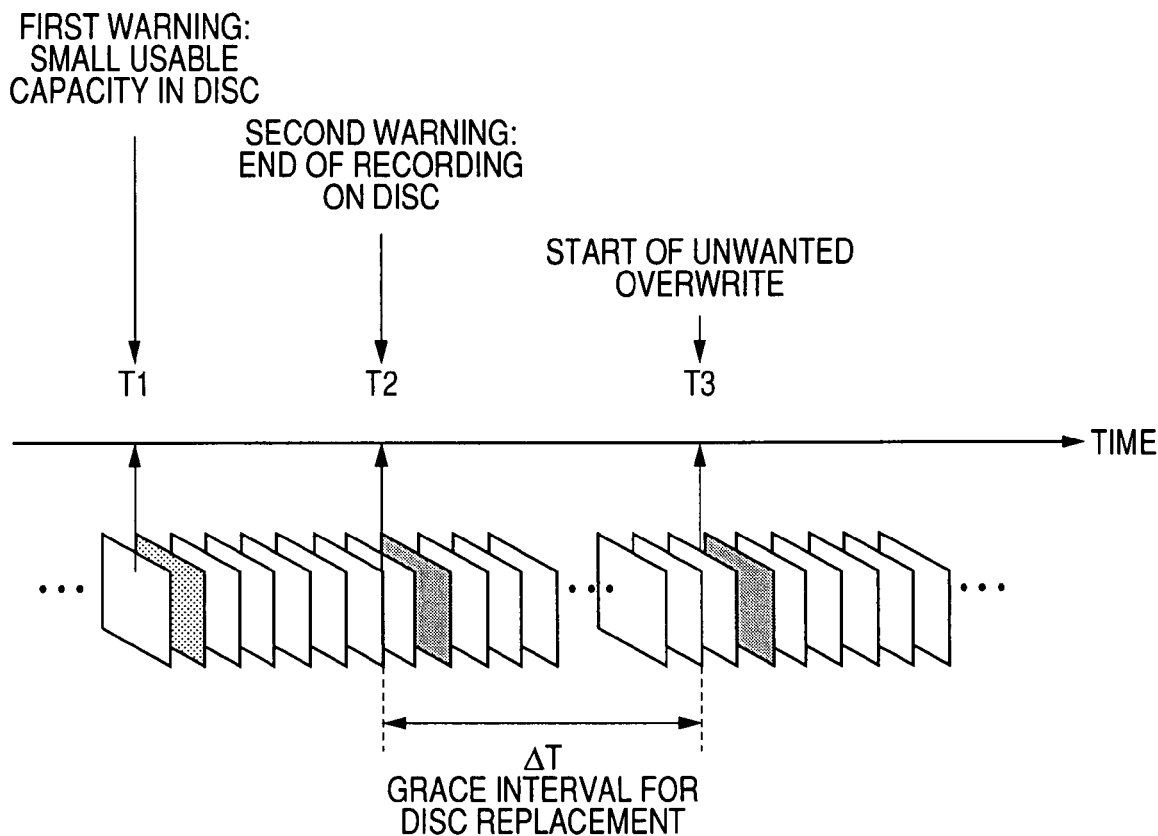
FIG. 11 is a diagram showing an example of a picture stream represented by captured-image/sound data continuously recorded on a plurality of optical discs.

FIG. 11 shows an example of a picture stream represented by captured-image/sound data continuously recorded on a plurality of optical discs. As previously mentioned, the apparatus monitors the remaining usable capacity of the current optical disc 107. The apparatus compares the monitored remaining usable capacity with a prescribed value chosen to correspond to a disc condition occurring before the disappearance of the remaining usable capacity. In FIG. 11, at a moment T1, the monitored remaining usable capacity drops to the prescribed value. At the moment T1, the apparatus responds to the result of the above comparison and indicates, on the display 109, a warning message like "usable recording capacity of disc #m will disappear soon; please prepare for disc replacement in case of continuous recording".

The apparatus decides whether or not the remaining usable capacity of the current optical disc 107 substantially disappears. In FIG. 11, at a moment T2, the remaining usable capacity of the current optical disc 107 substantially disappears. At the moment T2, the apparatus indicates, on the display 109, a warning message like "usable recording capacity of disc #m disappears now; please immediately perform disc replacement in case of continuous recording".

In FIG. 11, after the moment T2, the captured-image/sound data continues to be stored in the recording buffer 101. The reference character "T3" denotes a moment at which new captured-image/sound data starts to be written over old captured-image/sound data in the recording buffer 101 which has not been recorded on the current optical disc 107 yet. Therefore, in respect of preventing new captured-image/sound data from being written over old captured-image/sound data in the recording buffer 101 which has not been recorded on the current optical disc 107 yet, the time interval ΔT between the moments T2 and T3 is prescribed grace one for optical-disc replacement.

To continuously record captured-image/sound data on a plurality of optical discs without a break or breaks, it is necessary to satisfy the following conditions. After the recording of captured-image/sound data on a current optical disc #m ends, intra-disc management information and inter-disc management information are recorded on the current optical disc #m. Then, the current optical disc #m is replaced with a next optical disc #n (n=m+1), and the recording of captured-image/sound data on the next optical disc #n starts. The time interval between the moment of the end of the recording of the captured-image/sound data on the current optical disc #m and the moment of the start of the recording of the captured-image/sound data on the next optical disc #n is within the grace time interval ΔT for optical-disc replacement.

Figure 12:
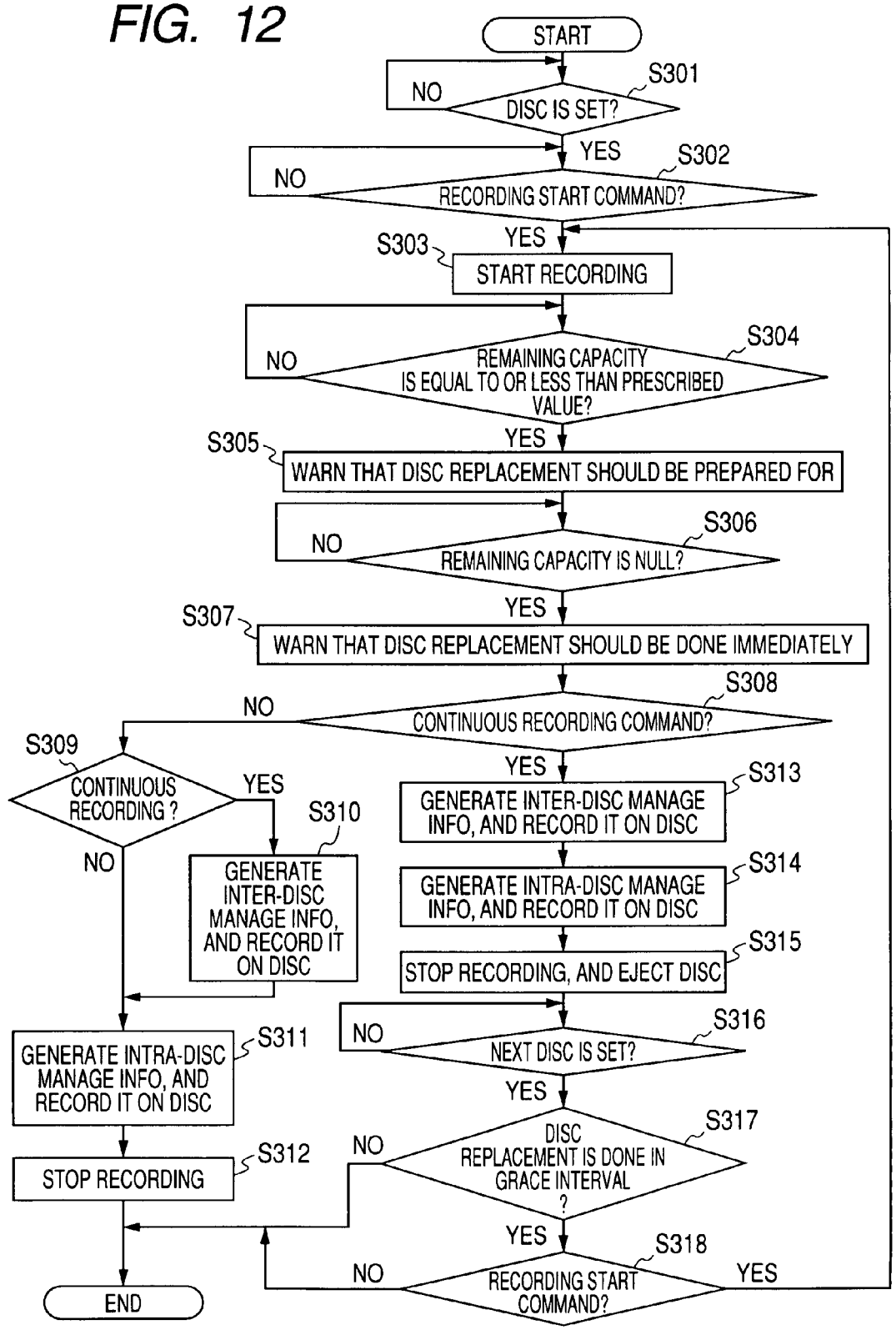
FIG. 12 is a flowchart of a segment of a control program for a recording control section in FIG. 1.

In the apparatus of FIG. 1, the recording control section 105 operates in accordance with a control program (a computer program) stored in the ROM or the RAM as previously mentioned. FIG. 12 is a flowchart of a segment of the control program.

As shown in FIG. 12, a first step S301 of the program segment decides whether or not an optical disc 107 is set in the disc drive 104 on the basis of information from the disc drive 104. When an optical disc 107 is set in the disc drive 104, the program advances from the step S301 to a step S302. Otherwise, the step S301 is repeated.

The step S302 decides whether or not user's command to start recording is inputted. When user's command to start recording is inputted, the program advances from the step S302 to a step S303. Otherwise, the step S302 is repeated.

The step S303 controls the audio visual compression device 100, the recording buffer 101, and the disc drive 104 to start the recording of continuous captured-image/sound data on the optical disc 107. After the step S303, the program advances to a step S304.

The step S304 detects or calculates the remaining usable capacity of the optical disc 107. The step S304 compares the detected or calculated remaining usable capacity with the prescribed value. When the comparison result indicates that the remaining usable capacity is equal to or less than the prescribed value, the program advances from the step S304 to a step S305. Otherwise, the step S304 is repeated. The step S304 serves to decide whether or not the present time reaches the moment T1 in FIG. 11.

The step S305 generates a signal of a first announcement picture. The step S305 sends the signal of the first announcement picture to the display 109 via the interface 106. The display 109 presents the first announcement picture to the user. The first announcement picture has a warning message like "usable recording capacity of disc #m will disappear soon; please prepare for disc replacement in case of continuous recording". After the step S305, the program advances to a step S306.

The step S306 detects or calculates the remaining usable capacity of the optical disc 107. The step S306 decides whether or not the detected or calculated remaining usable capacity is substantially zero. When the remaining usable capacity is substantially zero, the program advances from the step S306 to a step S307. Otherwise, the step S306 is repeated. The step S306 serves to decide whether or not the present time reaches the moment T2 in FIG. 11.

The step S307 generates a signal of a second announcement picture. The step S307 sends the signal of the second announcement picture to the display 109 via the interface 106. The display 109 presents the second announcement picture to the user. The second announcement picture has a warning message like "usable recording capacity of disc #m disappears now; please immediately perform disc replacement in case of continuous recording".

Usually, in response to the first and second announcement pictures, the user inputs into the apparatus a command to continue recording. In some cases, the user does not input a command to continue recording.

A step S308 following the step S307 decides whether or not user's command to continue recording is inputted. When user's command to continue recording is inputted, the program advances from the step S308 to a step S313. Otherwise, the program advances from the step S308 to a step S309.

The step S309 decides whether or not the recording implemented hitherto is the continuous recording of captured-image/sound data on a plurality of optical discs. In the case where the recording implemented hitherto is the continuous recording, the program advances from the step S309 to a step S310. Otherwise, the program advances from the step S309 to a step S311.

The step S310 generates inter-disc management information, and stores the inter-disc management information in the recording buffer 101. The step S310 controls the recording buffer 101 and the disc drive 104 to record the inter-disc management information on the optical disc 107. In this case, an optical disc 107 following the present optical disc 107 is absent. Accordingly, the inter-disc management information is designed for the last optical disc, and hence lacks disc ID of a following optical disc and data ID of a captured-image/sound data portion recorded on the following optical disc (see FIG. 8). After the step S310, the program advances to the step S311.

For example, the step S310 decides disc ID of the current optical disc 107 and data ID of the captured-image/sound data portion recorded on the current optical disc 107. The step S310 derives disc ID of the preceding optical disc 107, data ID of a captured-image/sound data portion recorded on the preceding optical disc 107, the sequence ID of the captured-image/sound data recorded on the preceding and current optical discs 107, and playback order information from the inter-disc management information for the preceding optical disc 107 in the recording buffer 101. The step S310 increments the derived playback order information by "1" to generate new playback order information. The step S310 generates inter-disc management information for the current optical disc 107 from the disc ID of the current optical disc 107, the data ID of the captured-image/sound data portion recorded on the current optical disc 107, the disc ID of the preceding optical disc 107, the data ID of the captured-image/sound data portion recorded on the preceding optical disc 107, the sequence ID of the captured-image/sound data recorded on the preceding and current optical discs 107, and the new playback order information.

The step S311 generates intra-disc management information, and stores the intra-disc management information in the recording buffer 101. The step S311 controls the recording buffer 101 and the disc drive 104 to record the intra-disc management information on the optical disc 107.

It should be noted that the steps S309, S310, and S311 may be arranged in the order as "S311→S309→S310".

A step S312 following the step S311 controls the disc drive 104 to stop data recording on the optical disc 107. After the step S312, the current execution cycle of the program segment ends.

The step S313 generates inter-disc management information, and stores the inter-disc management information in the recording buffer 101. The step S313 controls the recording buffer 101 and the disc drive 104 to record the inter-disc management information on the optical disc 107. In this case, an optical disc 107 following the present optical disc 107 is present. Accordingly, the inter-disc management information is designed for the first or intermediate optical disc, and hence has parameters related to a following optical disc.

For example, in the absence of inter-disc management information for a preceding optical disc 107 from the recording buffer 101, the step S313 decides disc ID of the current optical disc 107, data ID of the captured-image/sound data portion recorded on the current optical disc 107, and sequence ID of the captured-image/sound data recorded on the current and following optical discs 107. The step S313 sets disc ID of the following optical disc 107 and data ID of a captured-image/sound data portion recorded on the following optical disc 107 to "NEXT". The step S313 sets playback order information to "1". The step S313 generates inter-disc management information for the current optical disc 107 from the disc ID of the current optical disc 107, the data ID of the captured-image/sound data portion recorded on the current optical disc 107, the disc ID ("NEXT") of the following optical disc 107, the data ID ("NEXT") of the captured-image/sound data portion recorded on the following optical disc 107, the sequence ID of the captured-image/sound data recorded on the current and following optical discs 107, and the playback order information ("1").

For example, when inter-disc management information for a preceding optical disc 107 is present in the recording buffer 101, the step S313 decides disc ID of the current optical disc 107 and data ID of the captured-image/sound data portion recorded on the current optical disc 107. The step S310 derives disc ID of the preceding optical disc 107, data ID of a captured-image/sound data portion recorded on the preceding optical disc 107, the sequence ID of the captured-image/sound data recorded on the preceding, current, and following optical discs 107, and playback order information from the inter-disc management information for the preceding optical disc 107 in the recording buffer 101. The step S313 sets disc ID of the following optical disc 107 and data ID of a captured-image/sound data portion recorded on the following optical disc 107 to "NEXT". The step S313 increments the derived playback order information by "1" to generate new playback order information. The step S313 generates inter-disc management information for the current optical disc 107 from the disc ID of the current optical disc 107, the data ID of the captured-image/sound data portion recorded on the current optical disc 107, the disc ID of the preceding optical disc 107, the data ID of the captured-image/sound data portion recorded on the preceding optical disc 107, the disc ID ("NEXT") of the following optical disc 107, the data ID ("NEXT") of the captured-image/sound data portion recorded on the following optical disc 107, the sequence ID of the captured-image/sound data recorded on the preceding, current, and following optical discs 107, and the new playback order information.

A step S314 following the step S313 generates intra-disc management information, and stores the intra-disc management information in the recording buffer 101. The step S314 controls the recording buffer 101 and the disc drive 104 to record the intra-disc management information on the optical disc 107.

It should be noted that the steps S313 and S314 may be reversed in the order.

A step S315 subsequent to the step S314 controls the disc drive 104 to stop recording on the optical disc 107 and then eject the optical disc 107 therefrom. After the step S315, the program advances to a step S316.

Usually, the user sets a next optical disc (a following optical disc) 307 in the disc drive 104 immediately after the present optical disc 107 is ejected therefrom. Subsequently, the user inputs into the apparatus a command to start recording on the next optical disc 107.

The step S316 decides whether or not a next optical disc (a following optical disc) 107 is set in the disc drive 104 on the basis of information from the disc drive 104. When a next optical disc 107 is set in the disc drive 104, the program advances from the step S316 to a step S317. Otherwise, the step S316 is repeated.

The step S317 decides whether or not optical-disc replacement is completed in the previously-indicated grace time interval ΔT. In the case where optical-disc replacement is completed in the grace time interval ΔT, the program advances from the step S317 to a step S318. Otherwise, the program exits from the step S317 and then the current execution cycle of the program segment ends.

The step S318 decides whether or not user's command to start recording on the next optical disc 107 is inputted. When user's command to start recording is inputted, the program returns from the step S318 to the step S303. Thus, in this case, the continuous recording of captured-image/sound data on the current and next optical discs 107 is carried out. On the other hand, when user's command to start recording is not inputted, the program exits from the step S318 and then the current execution cycle of the program segment ends.

It should be noted that the steps S317 and S318 may be omitted from the program segment. In this case, when the step S316 decides that a next optical disc 107 is set in the disc drive 104, the program returns from the step S316 to the step S303.

The apparatus of FIG. 1 can continuously record audio visual data on a plurality of optical discs 107. Regarding the continuous recording of audio visual data on a plurality of optical discs 107, the apparatus generates inter-disc management information for each of the optical discs 107 and records the generated inter-disc management information thereon. Inter-disc management information for an optical disc 107 of interest has parameters indicating the disc ID of the optical disc 107 of interest, the data ID of an audio visual data portion recorded on the optical disc 107 of interest, the disc ID of an optical disc 107 preceding the optical disc 107 of interest as viewed in the direction of continuous recording, the data ID of an audio visual data portion recorded on the preceding optical disc 107, the disc ID of an optical disc 107 following the optical disc 107 of interest as viewed in the direction of continuous recording, and the data ID of an audio visual data portion recorded on the following optical disc 107. For the reproduction of audio visual data from the optical discs 107 by an optical disc player, inter-disc management information is read from an optical disc 107 currently set in the player and the parameters in the read inter-disc management information are checked. Thereby, audio visual data can be reproduced from the optical discs 107 in the correct order.

The inter-disc management information for the optical disc 107 of interest further has parameters indicating the sequence ID of audio visual data recorded on the optical discs 107, and the playback order number of the optical disc 107 of interest in playback of the audio visual data from the optical discs 107. As previously mentioned, for the reproduction of audio visual data from the optical discs 107 by the optical disc player, inter-disc management information is read from an optical disc 107 currently set in the player and the sequence ID and the playback order number in the read inter-disc management information are checked. Thereby, audio visual data can be accurately reproduced from the optical discs 107.

The apparatus in the video camera allows the following actions. When the usable recoding capacity of the current optical disc 107 disappears, the transfer of captured-image/sound data from the recording buffer 101 to the disc drive 104 is suspended and the recording of captured-image/sound data on the current optical disc 107 is stopped. On the other hand, captured-image/sound data continues to be stored in the recording buffer 101 from the audio visual compression device 103. The current optical disc 107 is replaced with next one before captured-image/sound data from the audio visual compression device 103 starts to be written over captured-image/sound data in the recording buffer 101 which has not been recorded on the current optical disc 107. Then, the transfer of captured-image/sound data from the recording buffer 101 to the disc drive 104 is restarted and the recording of captured-image/sound data on the next optical disc 107 is started. In this case, captured-image/sound data can be continuously recorded on a plurality of optical discs without a break.

The apparatus in the video camera records inter-disc management information on each of optical discs used for the continuous recording of captured-image/sound data. The inter-disc management information represents the relation among the optical discs, and the relation among portions of the captured-image/sound data which are recorded on the optical discs respectively.

Second Embodiment

Figure 13:
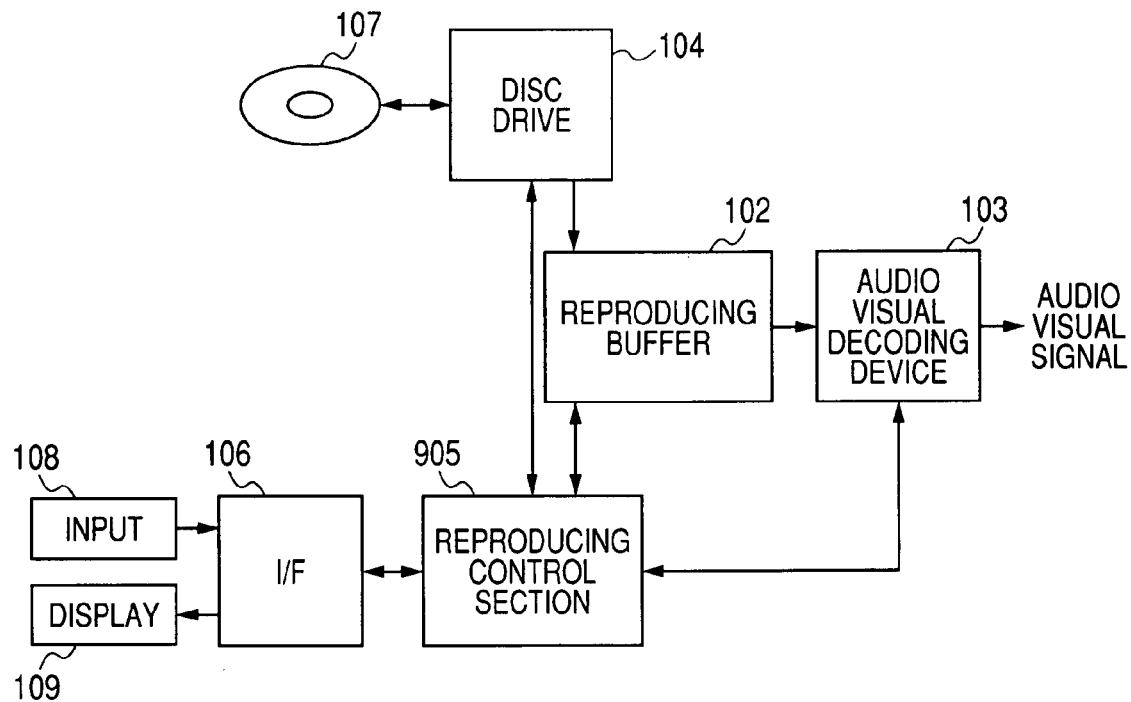
FIG. 13 is a block diagram of a video data reproducing apparatus according to a second embodiment of this invention.

FIG. 13 shows a video data reproducing apparatus according to a second embodiment of this invention. The apparatus of FIG. 13 includes a reproducing buffer 102, an audio visual decoding device 103, a disc drive 104, an interface (I/F) 106, an input device 108, a display 109, and a reproducing control section 905.

Preferably, the reproducing buffer 102 is a combination of a hard disc and a drive therefor, or a nonvolatile memory. The reproducing buffer 102 has a predetermined large capacity.

The disc drive 104 is designed for a removable optical disc 107. It should be noted that a combination of the optical disc 107 and the disc drive 104 may be replaced by a removable memory or a removable hard disc drive unit.

Preferably, the reproducing control section 905 includes a computer having a combination of an input/output port, a CPU, a ROM, and a RAM. In this case, the reproducing control section 905 operates in accordance with a control program (a computer program) stored in the ROM or the RAM. The control program is designed to enable the reproducing control section 905 to implement actions indicated hereafter.

The disc drive 104 reproduces a compressed audio visual signal from a predetermined audio visual data recording area in the optical disc 107 while being controlled by the reproducing control section 905. The disc drive 104 feeds the compressed audio visual signal to the reproducing buffer 102. The reproducing buffer 102 temporarily stores the compressed audio visual signal and outputs the compressed audio visual signal to the audio visual decoding device 103 while being controlled by the reproducing control section 905. The audio visual decoding device 103 expands the compressed audio visual signal to recover the original audio visual signal under the control by the reproducing control section 905. The audio visual decoding device 103 outputs the recovered audio visual signal to an external device (not shown).

A user can input control commands into the apparatus by actuating, for example, buttons on the input device 108. The input device 108 may include a remote control device. Examples of the control commands are a command to start playback, a command to stop playback, a command for continuous playback, and a command to eject an optical disc 107 from the apparatus (the disc drive 104). The playback start command includes information indicating a desired audio visual signal, that is, an audio visual signal to be reproduced. The interface 106 sends the inputted control commands to the reproducing control section 905. The reproducing control section 905 receives the control commands as control information. The reproducing control section 905 controls the disc drive 104, the reproducing buffer 102, and the audio visual decoding device 103 in response to the control information, thereby implementing signal reproduction (playback) from the optical disc 107.

The user can input a signal of user's selection into the apparatus by actuating the input device 108. The interface 106 sends the inputted user's selection signal to the reproducing control section 905.

Preferably, the apparatus of FIG. 13 is designed to accommodate only one optical disc 107. The user can replace the optical disc 107 in the apparatus with new one. The apparatus does not have an automatic disc changer or a mechanism for simultaneously loading a plurality of optical discs into disc drives.

The video data reproducing apparatus of FIG. 13 is matched with the video data recording apparatus of FIG. 1. Therefore, the apparatus of FIG. 13 can continuously reproduce audio visual data indicative of one audio visual sequence (one content, one movie, or one television program) from optical discs 107 which have been subjected to a continuous recording procedure by the apparatus of FIG. 1, and hence which are loaded with not only intra-disc management information but also inter-disc management information by the apparatus of FIG. 1.

The apparatus of FIG. 13 operates as follows. The reproducing control section 905 controls the disc drive 104 to reproduce intra-disc management information and inter-disc management information from the management information recording area of the optical disc 107. The disc drive 104 feeds the reproduced intra-disc management information and the reproduced inter-disc management information to the reproducing buffer 102. The reproducing control section 905 controls the reproducing buffer 102 so that a control information recording area in the reproducing buffer 102 will store the intra-disc management information and the inter-disc management information. The reproducing control section 905 reads the intra-disc management information and the inter-disc management information from the reproducing buffer 102. The reproducing control section 905 generates list information about audio visual data in the optical disc 107 in response to parameters in the intra-disc management information and the inter-disc management information. The list information represents a video list. The reproducing control section 905 sends the generated list information to the display 109 via the interface 106. The display 109 presents to the user the video list represented by the list information.

Usually, by referring to the video list, the user actuates the input device 108 and thereby selects one from all audio visual data portions in the optical disc 107 as an object to be played back. Here, "portion" basically means the whole, a first part, an intermediate part, or a last part of audio visual data representing one audio visual sequence (one content, one movie, or one television program). A signal of the user's selection is inputted into the apparatus. The interface 106 sends the inputted user's selection signal to the reproducing control section 905. The reproducing control section 905 accesses the intra-disc management information and the inter-disc management information in response to the user's selection signal, thereby obtaining disc address information about the selected audio visual data portion.

The reproducing control section 905 sends the obtained disc address information to the disc drive 104. The reproducing control section 905 controls the disc drive 104 to start data reproduction from the optical disc 107 at the obtained disc address information. Thereby, the disc drive 104 reads the selected audio visual data portion from the optical disc 107. The disc drive 104 feeds the selected audio visual data portion to the reproducing buffer 102. The reproducing control section 905 controls the reproducing buffer 102 so that an audio visual data recording area of the reproducing buffer 102 will temporarily store the selected audio visual data portion. The audio visual data recording area of the reproducing buffer 102 is separate from the control information recording area thereof. The reproducing buffer 102 feeds the selected audio visual data portion to the audio visual decoding device 103.

The reproducing control section 905 controls the audio visual decoding device 103 to subject the selected audio visual data portion to decoding inclusive of expansion. Thus, the audio visual decoding device 103 converts the selected audio visual data portion into a decoded audio visual data portion. The audio visual decoding device 103 outputs the decoded audio visual data portion to the external device (not shown).

Figure 14:
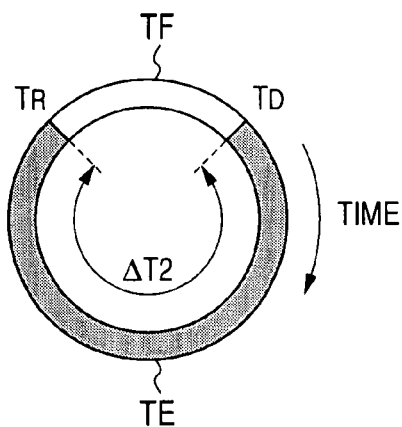
FIG. 14 is a diagram showing a virtual expression of an audio visual data recording area in a reproducing buffer in FIG. 13.

As shown in FIG. 14, the audio visual data recording area in the reproducing buffer 102 is virtually in the form of a ring. The compressively-encoded audio visual data read from the optical disc 107 by the disc drive 104 is recorded on the audio visual data recording area along the clockwise direction in accordance with the lapse of time.

In FIG. 14, the reference character "TR" denotes the newest position on the audio visual data recording area in the reproducing buffer 102 at which the audio visual data fed from the disc drive 104 is currently recorded. The reference character "TD" denotes the position on the audio visual data recording area in the reproducing buffer 102 at which the recorded audio visual data is currently transferred toward the audio video decoding device 103. Accordingly, the audio visual data which has not been transferred to the audio visual decoding device 103 yet is present in the recording-area portion TE extending from the position TD to the position TR as viewed in the direction of the lapse of time. On the other hand, the audio visual data which has already been transferred to the audio visual decoding device 103 is present in the recording-area portion TF extending from the position TR to the position TD as viewed in the direction of the lapse of time. Thus, the audio visual data fed from the disc drive 104 is allowed to be written over the audio visual data in the recording-area portion TF.

The reproducing control section 905 periodically checks whether or not the whole of the selected audio visual data portion has been read from the optical disc 107. When the whole of the selected audio visual data portion has been read from the optical disc 107, the reproducing control section 905 controls the disc drive 104 to suspend the data reading from the optical disc 107. At this time, the writing of the selected audio visual data portion into the reproducing buffer 102 from the disc drive 104 is also suspended so that the position TR stops. On the other hand, the selected audio visual data portion continues to be transferred from the reproducing buffer 102 to the audio visual decoding device 103. Thus, the position TD keeps moving clockwise in accordance with the lapse of time while the position TR remains stationary. The selected audio visual data portion continues to be decoded by the audio visual decoding device 103. Accordingly, the audio visual decoding device 103 remains outputting the decoded audio visual data portion.

The reproducing control section 905 derives the disc ID of a next optical disc (a second optical disc) 107 from the inter-disc management information for the current optical disc (the first optical disc) 107. The reproducing control section 905 generates a signal representing an announcement picture in response to the disc ID of the next optical disc 107. The announcement picture is designed for urging the user to eject the current optical disc 107 from the disc drive 104 and then set the next optical disc 107 therein. The announcement picture contains information about the disc ID of the next optical disc 107. The reproducing control section 905 sends the signal of the announcement picture to the display 109 via the interface 106. The display 109 presents the announcement picture to the user. By referring to the presented announcement picture, the user can identify the next optical disc 107. Usually, the user replaces the current optical disc 107 with the next one in response to the presented announcement picture.

When the user carries out optical-disc replacement, a sensor in the disc drive 104 informs the reproducing control section 905 that the next optical disc (the second optical disc) 107 is set in position with respect to the disc-drive body or that optical-disc replacement has been completed. In response to this information from the sensor, the reproducing control section 905 controls the disc drive 104 to read the inter-disc management information from the second optical disc 107. The disc drive 104 outputs the inter-disc management information for the second optical disc 107 to the reproducing buffer 102. The reproducing control section 905 controls the reproducing buffer 102 so that the control information recording area of the reproducing buffer 102 will store the inter-disc management information for the second optical disc 107. The reproducing control section 905 accesses the inter-disc management information for the second optical disc 107 in the reproducing buffer 102. The reproducing control section 905 derives the disc ID of the second optical disc 107 from the accessed inter-disc management information. The reproducing control section 905 compares the derived disc ID of the second optical disc 107 and the next-optical-disc ID in the inter-disc management information for the first optical disc 107 which is stored in the reproducing buffer 102. The second optical disc 107 is proved to be the desired one (the next optical disc) when the comparison result indicates that the two disc IDs are the same. Otherwise, the second optical disc 107 is proved to be different from the desired one. When the second optical disc 107 is proved to be the desired one, the reproducing control section 905 controls the disc drive 104 to read the intra-disc management information from the second optical disc 107. The disc drive 104 feeds the intra-disc management information for the second optical disc 107 to the reproducing buffer 102. The reproducing control section 905 controls the reproducing buffer 102 so that the control information recording area of the reproducing buffer 102 will store the intra-disc management information for the second optical disc 107.

By referring to the inter-disc management information for the first optical disc 107 or that for the second optical disc 107 in the reproducing buffer 102, the reproducing control section 905 detects the data ID of an audio visual data portion in the second optical disc 107 which follows the audio visual data portion read from the first optical disc 107. The reproducing control section 905 accesses the intra-disc management information for the second optical disc 107 in the reproducing buffer 102 in response to the detected data ID to search for an audio visual data portion corresponding to the detected data ID. The reproducing control section 905 controls the disc drive 104 to start reading the search-result audio visual data portion from the second optical disc 107. The disc drive 104 feeds the read audio visual data portion to the reproducing buffer 102. The reproducing control section 905 controls the reproducing buffer 102 so that the audio visual data recording area of the reproducing buffer 102 will temporarily store the fed audio visual data portion. The reproducing buffer 102 outputs the stored audio visual data portion to the audio visual decoding device 103. The audio visual decoding device 103 decodes the audio visual data portion to recover the original audio visual data portion.

In the case where the user carries out optical-disc replacement in the interval ΔT2 (see FIG. 14) corresponding to the recording-area portion TE extending from the position TD to the position TR as viewed in the direction of the lapse of time, the writing of the audio visual data into the reproducing buffer 102 is restarted at the position TR. Therefore, the audio visual data is continuously reproduced from the two optical discs 107 without being broken.

Preferably, the reproducing control section 905 decides whether or not optical-disc replacement fails to be completed in the interval ΔT2. In the event that optical-disc replacement fails to be completed in the interval ΔT2, the reproducing control section 905 controls the reproducing buffer 102 and the audio visual decoding device 103 so that the transfer of the audio visual data from the reproducing buffer 102 to the audio visual decoding device 103 will be stopped and the decoding by the audio visual decoding device 103 will be suspended when the position TD reaches the position TR. In this case, the transfer of the audio visual data from the reproducing buffer 102 to the audio visual decoding device 103 is continued and the decoding by the audio visual decoding device 103 is maintained until the position TD reaches the position TR.

Audio visual data having one audio visual sequence or one content (for example, one movie or one television program) can be continuously reproduced from three or more optical discs similarly to the above-mentioned continuous reproduction of audio visual data from two optical discs.

In the apparatus of FIG. 13, the reproducing control section 905 operates in accordance with a control program (a computer program) stored in the ROM or the RAM as previously mentioned. FIGS. 15-18 are a flowchart of a segment of the control program.

Figure 15:
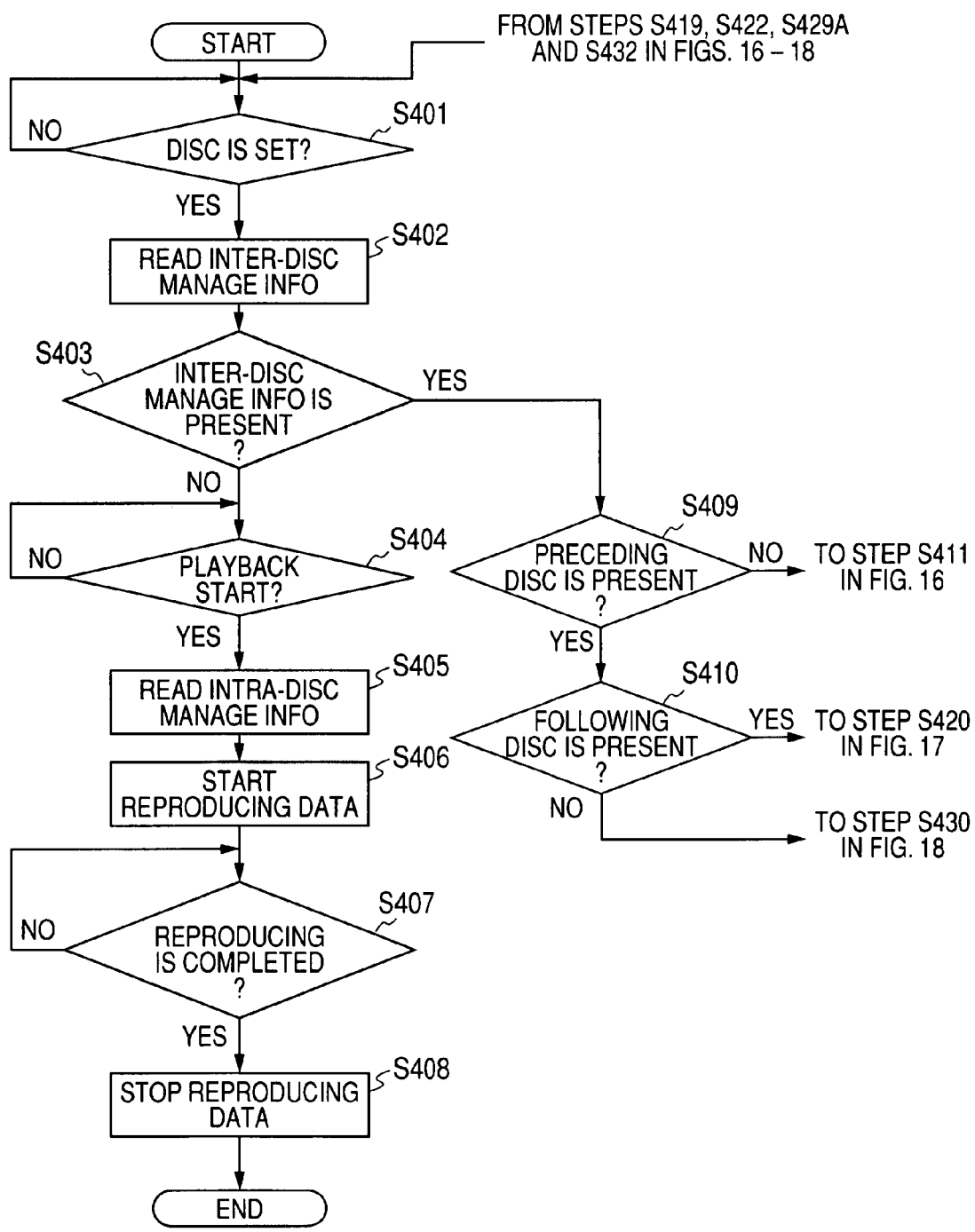
FIGS. 15-18 are a flowchart of a control program for a reproducing control section in FIG. 13.

As shown in FIG. 15, a first step S401 of the program segment decides whether or not an optical disc 107 is set in the disc drive 104 on the basis of information from the disc drive 104. When an optical disc 107 is set in the disc drive 104, the program advances from the step S401 to a step S402. Otherwise, the step S401 is repeated.

The step S402 controls the disc drive 104 to read inter-disc management information from the optical disc 107. The disc drive 104 feeds the read inter-disc management information to the reproducing buffer 102. The step S402 controls the reproducing buffer 102 to store the inter-disc management information. In the absence of inter-disc management information from the optical disc 107, the reading of the inter-disc management information fails.

A step S403 decides whether inter-disc management information is present in or absent from the optical disc 107 by referring to the result of the action by the step S402. This decision corresponds to a determination as to whether the optical disc 107 is one of optical discs used for the continuous recording of audio visual data representing one audio visual sequence or normal one storing only audio visual data independent of and unrelated to that in another. When inter-disc management information is absent from the optical disc 107, that is, when the optical disc 107 is normal one storing only audio visual data independent of and unrelated to that in another, the program advances from the step S403 to a step S404. On the other hand, when inter-disc management information is present in the optical disc 107, that is, when the optical disc 107 is one of optical discs used for the continuous recording of audio visual data representing one audio visual sequence, the program advances from the step S403 to a step S409.

The step S404 decides whether or not user's command to start playback is inputted. When user's command to start playback is inputted, the program advances from the step S404 to a step S405. Otherwise, the step S404 is repeated.

The step S405 controls the disc drive 104 to read intra-disc management information from the optical disc 107. The disc drive 104 feeds the read intra-disc management information to the reproducing buffer 102. The step S405 controls the reproducing buffer 102 to store the intra-disc management information.

A step S406 following the step S405 controls the disc drive 104, the reproducing buffer 102, and the audio visual decoding device 103 in response to the playback start command and the intra-disc management information in the reproducing buffer 102 to start reproducing a desired captured-image/sound data portion, which is designated by the playback start command, from the optical disc 107. After the step S406, the program advances to a step S407.

The step S407 decides whether or not the reproduction of the desired captured-image/sound data portion is completed. When the reproduction of the desired captured-image/sound data portion is completed, the program advances from the step S407 to a step S408. Otherwise, the step S407 is repeated.

The step S408 controls the disc drive 104 to stop data reproduction from the optical disc 107. After the step S408, the current execution cycle of the program segment ends.

It should be noted that the step S408 may be followed by first and second steps designed as follows. The first step decides whether or not user's command to eject the optical disc 107 is inputted. When user's command to eject the optical disc 107 is inputted, the second step controls the disc drive 104 to eject the optical disc 107 therefrom.

The step S409 decides whether or not the inter-disc management information in the reproducing buffer 102 indicates the presence of an optical disc 107 preceding the current optical disc 107 as viewed in the direction of the sequential recording of captured-image/sound data on a plurality of optical discs. In other words, the step S409 decides whether or not the current optical disc 107 is the first one among optical discs used for the sequential recording of captured-image/sound data. Specifically, the decision is made by determining whether or not the inter-disc management information has parameters related to a preceding optical disc 107. Alternatively, the decision may be made by determining whether or not the playback order number of the current optical disc 107 which is indicated by the inter-disc management information is "1". When the current optical disc 107 is the first one among optical discs used for the sequential recording of captured-image/sound data, the program advances from the step S409 to a step S411 (see FIG. 16). Otherwise, the program advances from the step S409 to a step S410.

The step S410 decides whether or not the inter-disc management information in the reproducing buffer 102 indicates the presence of an optical disc 107 following the current optical disc 107 as viewed in the direction of the sequential recording of captured-image/sound data on a plurality of optical discs. In other words, the step S410 decides whether or not the current optical disc 107 is the last one among optical discs used for the sequential recording of captured-image/sound data. Specifically, the decision is made by determining whether or not the inter-disc management information has parameters related to a following optical disc 107. When the current optical disc 107 is not the last one among optical discs used for the sequential recording of captured-image/sound data, that is, when the current optical disc 107 is intermediate one among optical discs used for the sequential recording of captured-image/sound data, the program advances from the step S410 to a step S420 (see FIG. 17). On the other hand, when the current optical disc 107 is the last one, the program advances from the step S410 to a step S430 (see FIG. 18).

Figure 16:
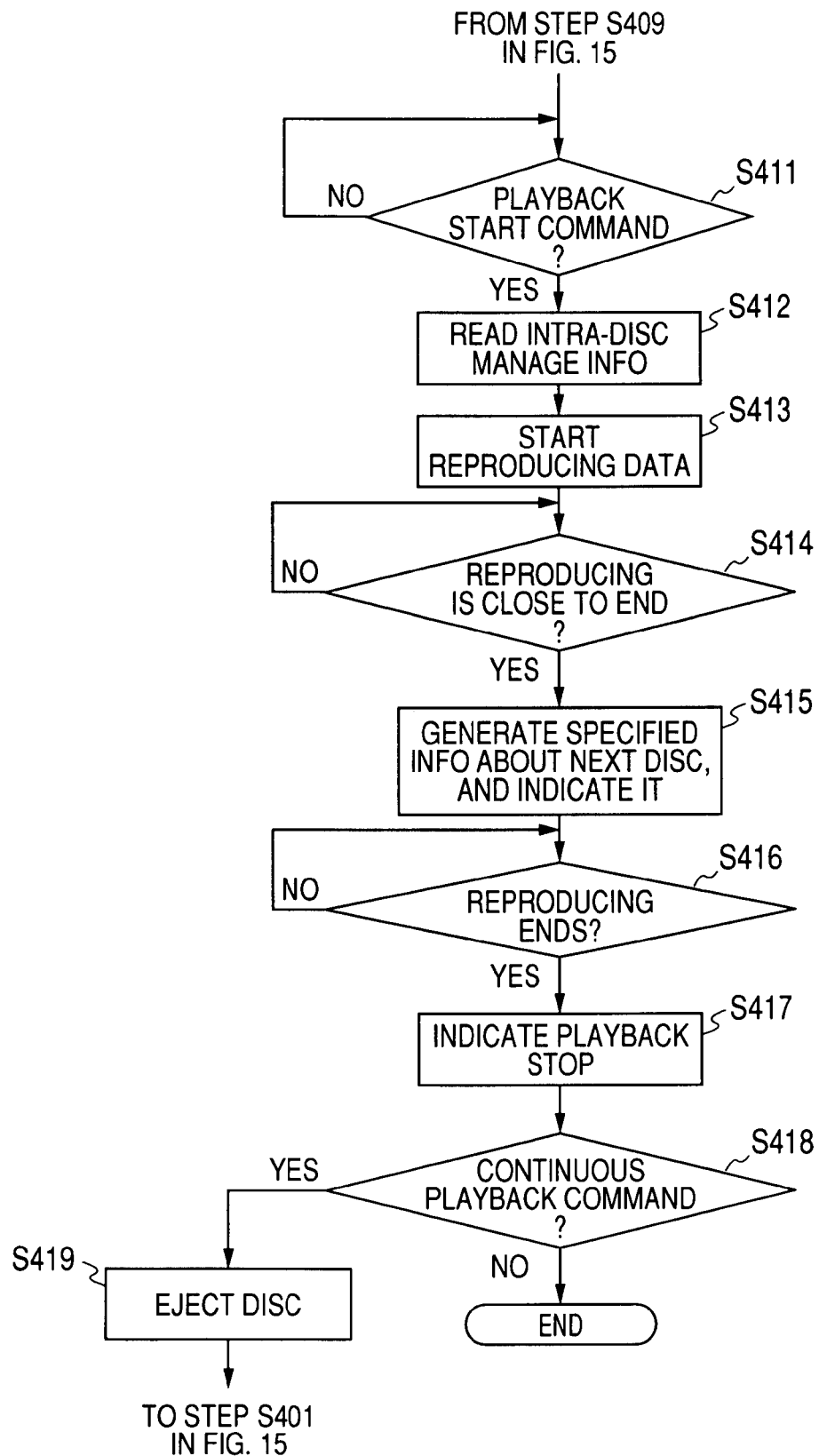

With reference to FIG. 16, the step S411 and subsequent steps are executed when the current optical disc 107 is the first one among optical discs used for the sequential recording of captured-image/sound data. The step S411 decides whether or not user's command to start playback is inputted. When user's command to start playback is inputted, the program advances from the step S411 to a step S412. Otherwise, the step S411 is repeated.

The step S412 controls the disc drive 104 to read intra-disc management information from the optical disc 107. The disc drive 104 feeds the read intra-disc management information to the reproducing buffer 102. The step S412 controls the reproducing buffer 102 to store the intra-disc management information.

A step S413 following the step S412 controls the disc drive 104, the reproducing buffer 102, and the audio visual decoding device 103 in response to the playback start command and the intra-disc management information in the reproducing buffer 102 to start reproducing a desired captured-image/sound data portion, which is designated by the playback start command, from the optical disc 107. After the step S413, the program advances to a step S414.

The step S414 calculates the remaining playback time (the remaining reproduction time) concerning the desired captured-image/sound data portion currently reproduced from the optical disc 107. This calculation is performed in a known way. The step S414 decides whether or not the calculated remaining playback time reaches a predetermined value equal to, for example, 5 minutes. This decision is to determine whether or not the present time is close to the end of the reproduction of the desired captured-image/sound data portion from the optical disc 107. When the calculated remaining playback time reaches the predetermined value, the program advances from the step S414 to a step S415. Otherwise, the step S414 is repeated.

The step S415 derives the disc ID of a next optical disc (a following optical disc) 107 and the data ID of a captured-image/sound data portion in the next optical disc 107 from the inter-disc management information in the reproducing buffer 102. The step S415 generates a picture signal representing the derived disc ID of the next optical disc 107 and the derived data ID of a captured-image/sound data portion in the next optical disc 107. The step S415 sends the generated picture signal to the display 109 via the interface 106. The display 109 presents the disc ID of the next optical disc 107 and the derived data ID of a captured-image/sound data portion in the next optical disc 107 to the user. This presentation urges the user to prepare for the replacement of the current optical disc 107 with the next one. After the step S415, the program advances to a step S416.

Thus, the step S415 generates specified information about the next optical disc 107 in response to the inter-disc management information in the reproducing buffer 102. The specified information contains the disc ID of the next optical disc 107 and the data ID of the captured-image/sound data portion in the next optical disc 107. The step S415 sends the specified information to the display 109 via the interface 106. The display 109 visualizes the contents of the specified information.

The step S416 decides whether the reproduction of the desired captured-image/sound data portion from the current optical disc 107 ends. In addition, the step S416 decides whether or not user's command to stop playback is inputted. When the reproduction of the desired captured-image/sound data portion from the current optical disc 107 ends or when user's command to stop playback is inputted, the program advances from the step S416 to a step S417. Otherwise, the step S416 is repeated.

The step S417 generates a signal of a message "playback stop". The step S417 sends the generated message signal to the display 109 via the interface 106. The display 109 presents the message "playback stop" to the user.

A step S418 following the step S417 decides whether or not user's command for continuous playback is inputted. When user's command for continuous playback is inputted, the program advances from the step S418 to a step S419. Otherwise, the program exits from the step S418 and then the current execution cycle of the program segment ends.

The step S419 controls the disc drive 104 to eject the current optical disc 107 therefrom. After the step S419, the program returns to the step S401 in FIG. 15.

Figure 17:
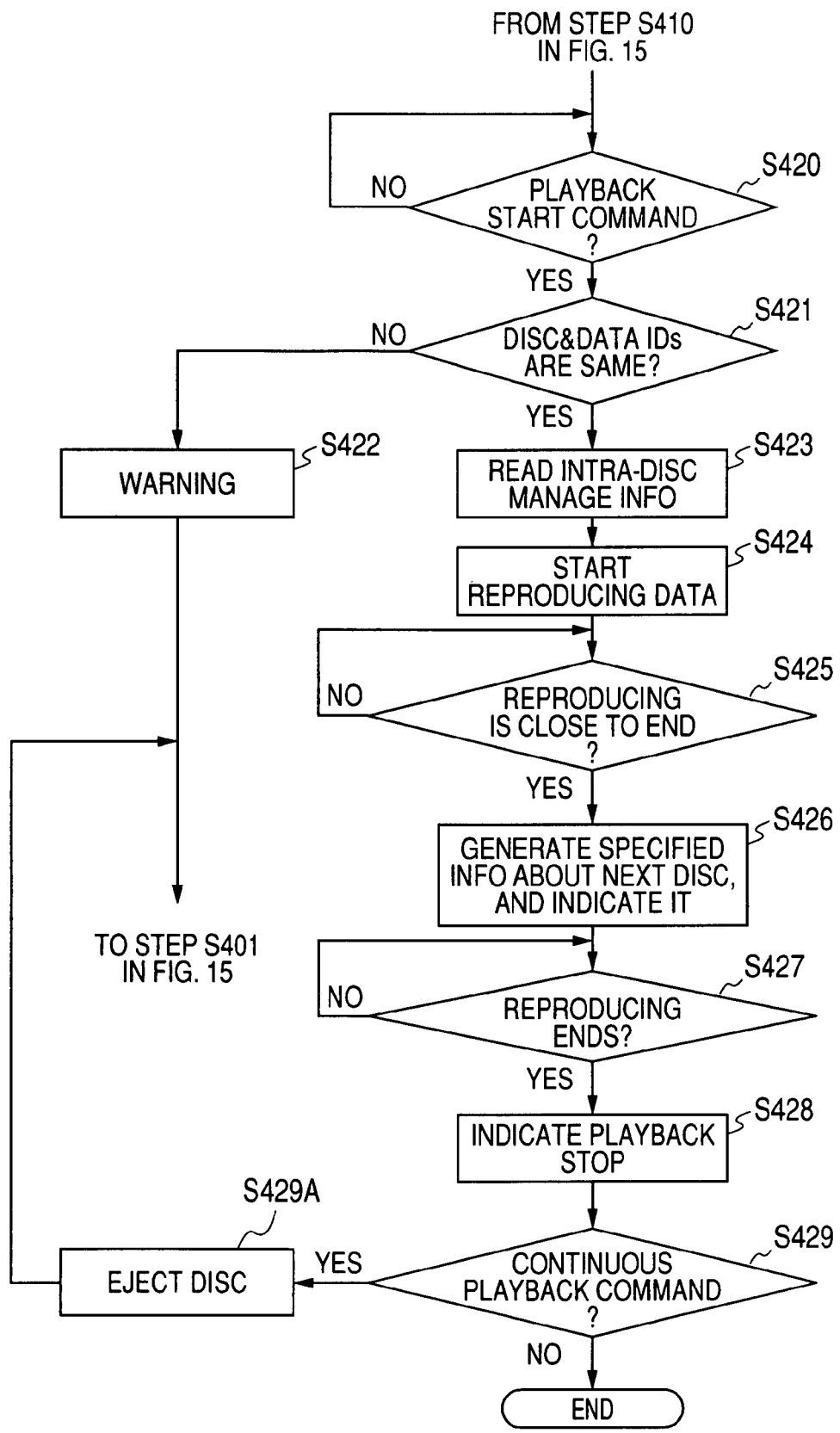

With reference to FIG. 17, the step S420 and subsequent steps are executed when the current optical disc 107 is intermediate one among optical discs used for the continuous recording of captured-image/sound data. The step S420 decides whether or not user's command to start playback is inputted. When user's command to start playback is inputted, the program advances from the step S420 to a step S421. Otherwise, the step S420 is repeated.

The step S421 accesses the inter-disc management information in the reproducing buffer 102 which has been read from the optical disc 107 preceding the current optical disc 107 as viewed in the direction of the continuous recording of captured-image/sound data on a plurality of optical discs. In addition, the step S421 accesses the inter-disc management information in the reproducing buffer 102 which has been read from the current optical disc 107. The step S421 derives the disc ID of a next optical disc (a following optical disc) 107 and the data ID of a captured-image/sound data portion in the next optical disc 107 from the inter-disc management information for the preceding optical disc 107. The derived disc ID and the derived data ID are called the first disc ID and the first data ID. The step S421 derives the disc ID of the current optical disc 107 and the data ID of a captured-image/sound data portion in the current optical disc 107 from the inter-disc management information for the current optical disc 107. The derived disc ID and the derived data ID are called the second disc ID and the second data ID. The step S421 decides whether or not the first disc ID and the first data ID are the same as the second disc ID and the second data ID. This decision is to determine whether or not the current optical disc 107 is correct one following the preceding optical disc 107 in the sequential reproduction of captured-image/sound data from a plurality of optical discs. When the first disc ID and the first data ID are different from the second disc ID and the second data ID, that is, when the current optical disc 107 differs from correct one following the preceding optical disc 107, the program advances from the step S421 to a step S422. On the other hand, when the first disc ID and the first data ID are the same as the second disc ID and the second data ID, that is, when the current optical disc 107 is correct one following the preceding optical disc 107, the program advances from the step S421 to a step S423.

The step S422 generates a signal of a warning picture. The step S422 sends the signal of the warning picture to the display 109 via the interface 106. The display 109 presents the warning picture to the user. The warning picture shows that playback is not "continuous". After the step S422, the program returns to the step S401 in FIG. 15.

The step S423 controls the disc drive 104 to read intra-disc management information from the optical disc 107. The disc drive 104 feeds the read intra-disc management information to the reproducing buffer 102. The step S423 controls the reproducing buffer 102 to store the intra-disc management information.

A step S424 following the step S423 identifies a captured-image/sound data portion desired to be reproduced from the current optical disc 107 by referring to the inter-disc management information for the preceding optical disc 107 or that for the current optical disc 107 in the reproducing buffer 102. Then, the step S424 controls the disc drive 104, the reproducing buffer 102, and the audio visual decoding device 103 in response to the playback start command and the intra-disc management information in the reproducing buffer 102 to start reproducing the desired captured-image/sound data portion from the optical disc 107. For example, the step S424 detects "the data ID of the captured-image/sound data portion recorded on the following optical disc 107" which is written in the inter-disc management information for the preceding optical disc 107 in the reproducing buffer 102. The step S424 identifies the desired captured-image/sound data portion in the current optical disc 107 in accordance with the detected data ID. After the step S424, the program advances to a step S425.

The step S425 calculates the remaining playback time (the remaining reproduction time) concerning the desired captured-image/sound data portion currently reproduced from the optical disc 107. This calculation is performed in a known way. The step S425 decides whether or not the calculated remaining playback time reaches a predetermined value equal to, for example, 5 minutes. This decision is to determine whether or not the present time is close to the end of the reproduction of the desired captured-image/sound data portion from the optical disc 107. When the calculated remaining playback time reaches the predetermined value, the program advances from the step S425 to a step S426. Otherwise, the step S425 is repeated.

The step S426 derives the disc ID of a next optical disc (a following optical disc) 107 and the data ID of a captured-image/sound data portion in the next optical disc 107 from the inter-disc management information for the current optical disc (the intermediate optical disc) 107 in the reproducing buffer 102. The step S426 generates a picture signal representing the derived disc ID of the next optical disc 107 and the derived data ID of a captured-image/sound data portion in the next optical disc 107. The step S426 sends the generated picture signal to the display 109 via the interface 106. The display 109 presents the disc ID of the next optical disc 107 and the derived data ID of a captured-image/sound data portion in the next optical disc 107 to the user. This presentation urges the user to prepare for the replacement of the current optical disc (the intermediate optical disc) 107 with the next one. After the step S426, the program advances to a step S427.

The step S427 decides whether the reproduction of the desired captured-image/sound data portion from the current optical disc (the intermediate optical disc) 107 ends. In addition, the step S427 decides whether or not user's command to stop playback is inputted. When the reproduction of the desired captured-image/sound data portion from the current optical disc 107 ends or when user's command to stop playback is inputted, the program advances from the step S427 to a step S428. Otherwise, the step S427 is repeated.

The step S428 generates a signal of a message "playback stop". The step S428 sends the generated message signal to the display 109 via the interface 106. The display 109 presents the message "playback stop" to the user.

A step S429 following the step S428 decides whether or not user's command for continuous playback is inputted. When user's command for continuous playback is inputted, the program advances from the step S429 to a step S429A. Otherwise, the program exits from the step S429 and then the current execution cycle of the program segment ends.

The step S429A controls the disc drive 104 to eject the current optical disc 107 therefrom. After the step S429A, the program returns to the step S401 in FIG. 15.

Figure 18:
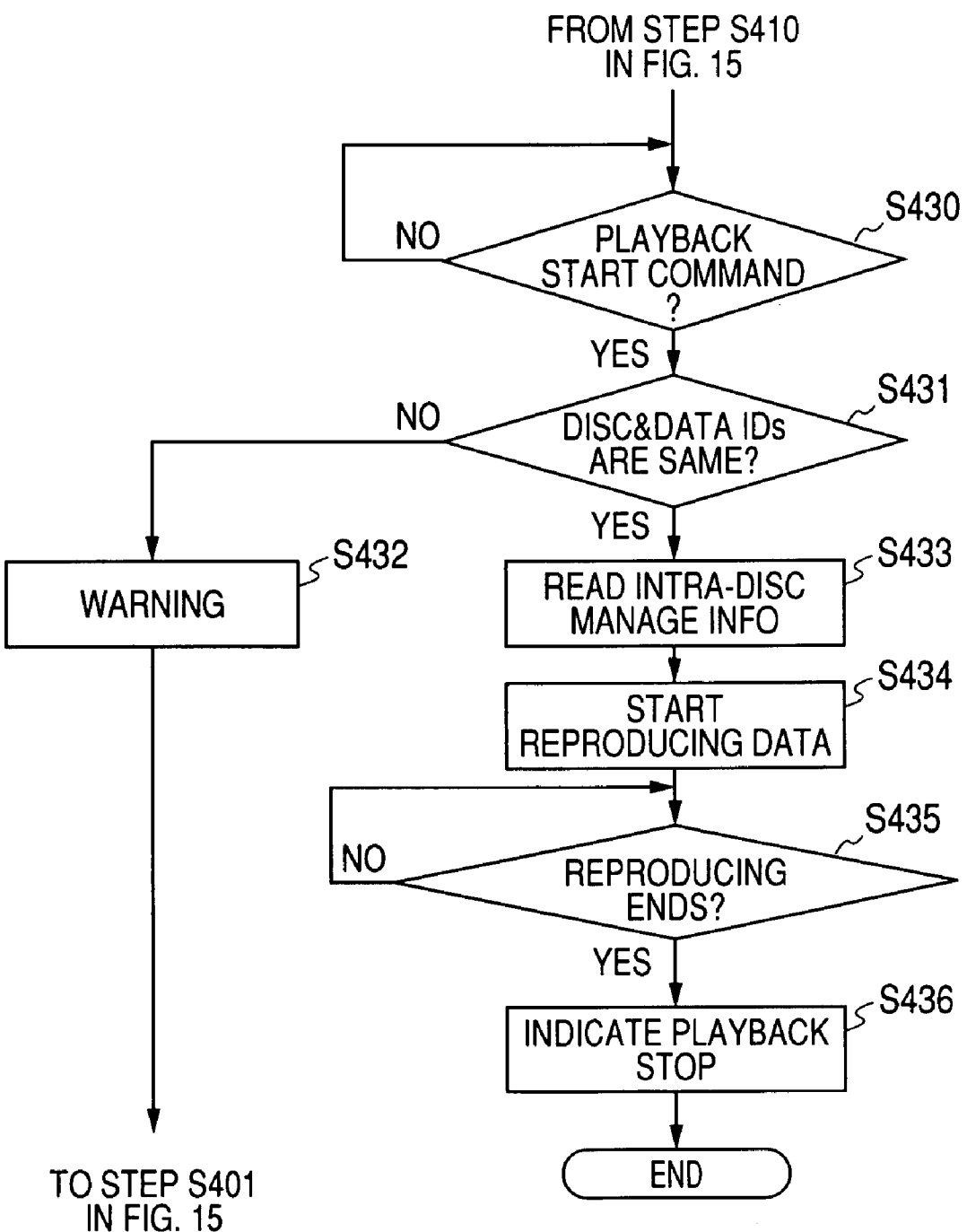

With reference to FIG. 18, the step S430 and subsequent steps are executed when the current optical disc 107 is the last one among optical discs used for the continuous recording of captured-image/sound data. The step S430 decides whether or not user's command to start playback is inputted. When user's command to start playback is inputted, the program advances from the step S430 to a step S431. Otherwise, the step S430 is repeated.

The step S431 accesses the inter-disc management information in the reproducing buffer 102 which has been read from the optical disc 107 preceding the current optical disc 107 as viewed in the direction of the continuous recording of captured-image/sound data on a plurality of optical discs. In addition, the step S431 accesses the inter-disc management information in the reproducing buffer 102 which has been read from the current optical disc 107. The step S431 derives the disc ID of a next optical disc (a following optical disc) 107 and the data ID of a captured-image/sound data portion in the next optical disc 107 from the inter-disc management information for the preceding optical disc 107. The derived disc ID and the derived data ID are called the first disc ID and the first data ID. The step S431 derives the disc ID of the current optical disc 107 and the data ID of a captured-image/sound data portion in the current optical disc 107 from the inter-disc management information for the current optical disc 107. The derived disc ID and the derived data ID are called the second disc ID and the second data ID. The step S431 decides whether or not the first disc ID and the first data ID are the same as the second disc ID and the second data ID. This decision is to determined whether or not the current optical disc 107 is correct one following the preceding optical disc 107 in the sequential reproduction of captured-image/sound data from a plurality of optical discs. When the first disc ID and the first data ID are different from the second disc ID and the second data ID, that is, when the current optical disc 107 differs from correct one following the preceding optical disc 107, the program advances from the step S431 to a step S432. On the other hand, when the first disc ID and the first data ID are the same as the second disc ID and the second data ID, that is, when the current optical disc 107 is correct one following the preceding optical disc 107, the program advances from the step S431 to a step S433.

The step S432 generates a signal of a warning picture. The step S432 sends the signal of the warning picture to the display 109 via the interface 106. The display 109 presents the warning picture to the user. The warning picture shows that playback is not "continuous". After the step S432, the program returns to the step S401 in FIG. 15.

The step S433 controls the disc drive 104 to read intra-disc management information from the optical disc 107. The disc drive 104 feeds the read intra-disc management information to the reproducing buffer 102. The step S433 controls the reproducing buffer 102 to store the intra-disc management information.

A step S434 following the step S433 identifies a captured-image/sound data portion desired to be reproduced from the current optical disc 107 by referring to the inter-disc management information for the preceding optical disc 107 or that for the current optical disc 107 in the reproducing buffer 102. Then, the step S434 controls the disc drive 104, the reproducing buffer 102, and the audio visual decoding device 103 in response to the playback start command and the intra-disc management information in the reproducing buffer 102 to start reproducing the desired captured-image/sound data portion from the optical disc 107. For example, the step S434 detects "the data ID of the captured-image/sound data portion recorded on the following optical disc 107" which is written in the inter-disc management information for the preceding optical disc 107 in the reproducing buffer 102. The step S434 identifies the desired captured-image/sound data portion in the current optical disc 107 in accordance with the detected data ID. After the step S434, the program advances to a step S435.

The step S435 decides whether the reproduction of the desired captured-image/sound data portion from the current optical disc (the intermediate optical disc) 107 ends. In addition, the step S435 decides whether or not user's command to stop playback is inputted. When the reproduction of the desired captured-image/sound data portion from the current optical disc 107 ends or when user's command to stop playback is inputted, the program advances from the step S435 to a step S436. Otherwise, the step S435 is repeated.

The step S436 generates a signal of a message "playback stop". The step S436 sends the generated message signal to the display 109 via the interface 106. The display 109 presents the message "playback stop" to the user. After the step S436, the current execution cycle of the program segment ends.

In the apparatus of FIG. 13, when a first optical disc 107 is replaced with a second optical disc 107 in the disc drive 104, the reproducing control section 905 controls the disc drive 104 to read inter-disc management information from the second optical disc 107. The disc drive 104 feeds the read inter-disc management information to the reproducing buffer 102. The reproducing control section 905 controls the reproducing buffer 102 to store the inter-disc management information for the second optical disc 107. The reproducing buffer 102 already stores the inter-disc management information for the first optical disc 107. The reproducing control section 905 derives the disc ID of a next optical disc (a following optical disc) 107 and the data ID of a captured-image/sound data portion in the next optical disc 107 from the inter-disc management information for the first optical disc 107 in the reproducing buffer 102. The derived disc ID and the derived data ID are called the first disc ID and the first data ID. The reproducing control section 905 derives the disc ID of the second optical disc 107 and the data ID of a captured-image/ sound data portion in the second optical disc 107 from the inter-disc management information for the second optical disc 107. The derived disc ID and the derived data ID are called the second disc ID and the second data ID. The reproducing control section 905 decides whether or not the first disc ID and the first data ID are the same as the second disc ID and the second data ID. This decision is to determined whether or not the second optical disc 107 is correct one following the first optical disc 107 in the sequential reproduction of captured-image/sound data from a plurality of optical discs. Only when the first disc ID and the first data ID are the same as the second disc ID and the second data ID, that is, only when the second optical disc 107 is correct one following the first optical disc 107, the reproducing control section 905 controls the disc drive 104, the reproducing buffer 102, and the audio visual decoding device 103 to start reproducing a desired captured-image/sound data portion from the second optical disc 107. Therefore, it is possible to sequentially reproduce captured-image/sound data from a plurality of optical discs in the accurate order.

The apparatus of FIG. 13 may detect the sequence ID and the playback order number indicated by the inter-disc management information read from the optical disc 107, and use the detected sequence ID and the detected playback order number for the continuous reproduction of audio visual data from a plurality of optical discs. In this case, the continuous reproduction of audio visual data from a plurality of optical discs can be more reliable.

In the apparatus of FIG. 13, the reproducing control section 905 may generate a signal of a list picture on the basis of the parameters in the inter-disc management information read from the optical disc 107. The list picture shows the relation among the current optical disc 107, the optical disc 107 preceding the current optical disc 107, and the optical disc 107 following the current optical disc 107 as viewed in the direction of the continuous recording of audio visual data on a plurality of optical discs. The reproducing control section 905 sends the signal of the list picture to the display 109 via the interface 106. The display 109 presents the list picture to the user. The list picture enables the user to easily grasp the conditions of the continuous recording of audio visual data on the preceding, current, and following optical discs.

In the apparatus of FIG. 13, the use of inter-disc management information allows the following actions. In the case where a first optical disc 107 from which first audio visual data has been reproduced is replaced with a second optical disc 107 loaded with second audio visual data continuing from the first audio visual data, a position on the second optical disc 107 at which the recorded second audio visual data starts is automatically searched for without requiring the user to point out a playback start position for the second audio visual data. Therefore, the first audio visual data and the second audio visual data can be sequentially reproduced without a break.

The apparatus of FIG. 13 dispenses with an automatic disc changer or a mechanism for simultaneously loading a plurality of optical discs into disc drives. Thus, the apparatus of FIG. 13 can be provided in a mobile machine such as a camcorder or a video camera.

Third Embodiment

According to a third embodiment of this invention, the video data recording apparatus of FIG. 1 and the video data reproducing apparatus of FIG. 13 are in a video data recording/reproducing apparatus such as a video camera. In the third embodiment of this invention, the disc drive 104, the interface 106, the input device 108, and the display 109 are common to the recording side and the reproducing side. A single buffer may be used as the recording buffer 101 and the reproducing buffer 102. The recording control section 105 and the reproducing control section 905 may be formed by a single control section. The audio visual compression device 100 and the audio visual decoding device 103 may be formed by a single audio visual compression/decoding device.

Fourth Embodiment

A video data recording apparatus in a fourth embodiment of this invention is similar to that in FIG. 1 except for additional features mentioned hereafter.

In the fourth embodiment of this invention, the apparatus generates a signal of a representative of pictures (images) represented by an audio visual data portion recorded on each of optical discs used for the continuous recording of audio visual data. The apparatus assigns identification information (ID) to the generated signal of the representative picture (image). The apparatus stores the signal of the representative picture in an internal buffer. The apparatus records, on the management information recording area of an optical disc of interest, (1) a signal of a representative picture for an audio visual data portion assigned to the optical disc of interest, (2) a signal of a representative picture for an audio visual data portion assigned to an optical disc preceding the optical disc of interest, and (3) a signal of a representative picture for an audio visual data portion assigned to an optical disc following the optical disc of interest. To inter-disc management information for the optical disc of interest, identification information (ID) of the signal of the representative picture for the audio visual data portion assigned to the preceding optical disc and ID of the signal of the representative picture for the audio visual data portion assigned to the following optical disc are added as parameters therein.

FIG. 19 shows an example of a syntax-based version of inter-disc management information in the fourth embodiment of this invention. The inter-disc management information in FIG. 19 is similar to that in FIG. 10 except that parameters "previous_data_image_ID" and "next_data image_ID" are added to the parameter group "manageInfoAmongDiscs( )". The parameter "previous_data_image_ID" is identification information (ID) about a representative picture signal, that is, a representative image signal, for an audio visual data portion recorded on an optical disc 107 immediately preceding the present optical disc (the current optical disc) 107 as viewed in the direction of the continuous recording of audio visual data on a plurality of optical discs. The parameter "next_data_image_ID" is identification information (ID) about a representative picture signal for an audio visual data portion recorded on an optical disc 107 immediately following the present optical disc (the current optical disc) 107 as viewed in the direction of the continuous recording of audio visual data on a plurality of optical discs. Each of the parameters "previous_data_image_ID" and "next_data_image_ID" is assigned 8 bytes. Thus, the inter-disc management information has 104 bytes in total since the thirteen 8-byte parameters constitute the inter-disc management information. It should be noted that a parameter "current_data_image_ID" may also be added which is identification information (ID) about a representative picture signal for an audio visual data portion recorded on the present optical disc (the current optical disc) 107.

The recording control section 105 generates a representative picture signal (a representative image signal) for an audio visual data portion recorded on each of optical discs used for the continuous recording of audio visual data, and also inter-disc management information for each of the optical discs. The control section 105 assigns ID to the generated representative picture signal. The recording control section 105 stores the generated representative picture signal and the generated inter-disc management information in the recording buffer 101. The recording control section 105 controls the recording buffer 101 and the disc drive 104 to record the representative picture signal and the inter-disc management information on the management information recording area in the corresponding optical disc. In certain conditions, representative picture signals for audio visual data portions recorded on respective optical discs used for the continuous recording of audio visual data are stored in the recording buffer 101. When specified one (or each of specified ones) among the optical discs used for the continuous recording of audio visual data is set in the disc drive 104, the recording control section 105 controls the recording buffer 101 and the disc drive 104 to record a representative picture signal on the management information recording area thereof as that for an audio visual data portion recorded on a preceding or following optical disc. Specifically, the recording control section 105 operates to record, on the current optical disc, (1) a representative picture signal for an audio visual data portion assigned to the current optical disc, (2) a representative picture signal for an audio visual data portion assigned to the preceding optical disc, and (3) a representative picture signal for an audio visual data portion assigned to the following optical disc. The inter-disc management information for the current optical disc indicates ID of the representative picture signal for the audio visual data portion assigned to the preceding optical disc and ID of the representative picture signal for the audio visual data portion assigned to the following optical disc.

As previously mentioned, the recording control section 105 generates a signal of a representative of pictures represented by an audio visual data portion recorded on the audio visual data recording area of the current optical disc 107. The recording control section 105 decides ID of the generated representative picture signal. The timing of the generation of the representative picture signal is prior or similar to that of the generation of inter-disc management information in the first embodiment of this invention. For example, the recording control section 105 reads, from the recording buffer 101, audio visual data which has already been recorded on the current optical disc 107. The recording control section 105 generates the representative picture signal on the basis of the read audio visual data. The recording control section 105 stores the generated representative picture signal and the generated inter-disc management information for the current optical disc 107 in the recording buffer 101. The recording control section 105 operates to add the ID of the representative picture signal to inter-disc management information as a parameter therein, where this inter-disc management information is that assigned to an optical disc or each of optical discs other than the current optical disc 107. The recording control section 105 controls the recording buffer 101 and the disc drive 104 to record the representative picture signal and the inter-disc management information for the current optical disc 107 on the management information recording area of the current optical disc 107. When specified one (or each of specified ones) among the optical discs used for the continuous recording of audio visual data is set in the disc drive 104, the recording control section 105 controls the recording buffer 101 and the disc drive 104 to record a representative picture signal thereon as that for an audio visual data portion assigned to an optical disc preceding or following the specified optical disc. Furthermore, the recording control section 105 operates to record, on the specified optical disc, the inter-disc management information indicating the ID of the representative picture signal for the audio visual data portion assigned to the preceding or following optical disc.

Preferably, the representative is one arbitrarily selected from pictures represented by an audio visual data potion recorded on the optical disc 107. The representative may be a reduced picture (a thumbnail) resulting from decimating or thinning out pixels constituting one arbitrarily selected from pictures represented by the recorded audio visual data portion. The representative may be one selected, by the user, from pictures represented by the recorded audio visual data portion. In this case, user's command for picture selection is inputted into the apparatus by actuating the input device 108, and the inputted user's command is sent to the recording control section 105 via the interface 106.

The recording control section 105 stores, in the recording buffer 101, the representative picture signal about the audio visual data portion recorded on each of optical discs used for the continuous recording of the audio visual data. Furthermore, the recording control section 105 stores, in the recording buffer 101, the inter-disc management information for each of the optical discs. The recording control section 105 may generate inter-disc management information for one of the optical discs by updating that for the preceding optical disc.

After a first optical disc in the disc drive 104 is replaced with second one, the recording control selection 105 controls the recording buffer 101 and the disc drive 104 to transfer a representative picture signal concerning the first optical disc, a representative picture signal concerning the second optical disc, and inter-disc management information inclusive of ID of the representative picture signal concerning the first optical disc from the recording buffer 101 to the disc drive 104 and record them on the second optical disc. In this case, the representative picture signal concerning the first optical disc and recorded on the second optical disc is labeled as a signal of a representative picture for an audio visual data portion in a preceding optical disc. The inter-disc management information recorded on the second optical indicates the ID of the representative picture signal for the audio visual data portion in the preceding optical disc. The recording control section 105 generates the representative picture signal concerning the second optical disc, and decides ID of the generated representative picture signal. In addition, the recording control section 105 generates inter-disc management information indicative of the decided ID of the representative picture signal. The recording control section 105 stores the generated representative picture signal and the generated inter-disc management information in the recording buffer 101. When the second optical disc in the disc drive 104 is replaced with third one, the recording control section 105 resets the inter-disc management information in the recording buffer 101 as that for the third optical disc. At this time, the representative-picture-signal ID in the inter-disc management information is reset to or labeled as the ID of a signal of a representative picture for an audio visual data portion in a preceding optical disc.

The recording control section 105 generates a signal of a representative picture about an optical disc to be set in the disc drive 104 next from audio visual data continuing from that recorded on the current optical disc. At this time, on a pre-reading basis, the recording control section 105 accesses the recording buffer 101 to obtain the audio visual data continuing from that recorded on the current optical disc. In addition, the recording control section 105 predetermines the ID of the generated representative picture signal.

It should be noted that as in the first embodiment of this invention, the inter-disc management information for the preceding optical disc may be updated or completed when the preceding optical disc is set in the disc drive 104 again.

Fifth Embodiment

A video data reproducing apparatus in a fifth embodiment of this invention is matched with the video data recording apparatus in the fourth embodiment thereof. Therefore, the video data reproducing apparatus in the fifth embodiment of this invention can continuously reproduce audio visual data representative of one audio visual sequence (one content, one movie, or one television program) from optical discs 107 which have been subjected to a continuous recording procedure by the video data recording apparatus in the fourth embodiment of this invention, and hence which are loaded with intra-disc management information, inter-disc management information, and representative picture signals (representative image signals) by the video data recording apparatus in the fourth embodiment of this invention.

Figure 20:
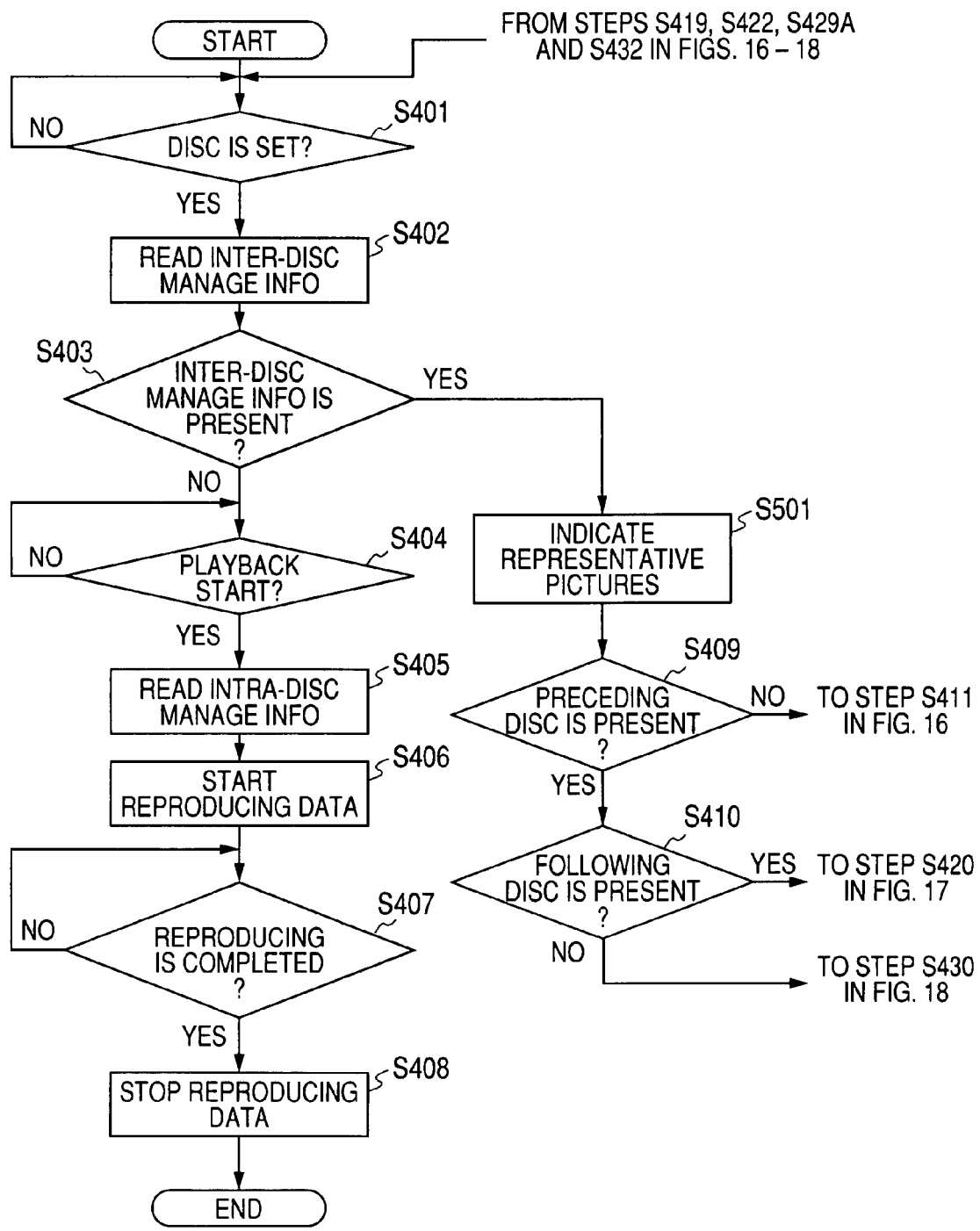
FIG. 20 is a flowchart of a segment of a control program for a reproducing control section in a fifth embodiment of this invention.

FIG. 20 is a flowchart of a segment of a control program for the reproducing control section 905 (see FIG. 13) in the fifth embodiment of this invention. Steps in FIG. 20 are similar to those in FIG. 15 except that a step S501 is added to the place between the steps S403 and S409.

As shown in FIG. 20, when the step S403 decides that inter-disc management information is present in the optical disc 107, that is, when the step S403 decides that the optical disc 107 is one of optical discs used for the continuous recording of audio visual data representing one audio visual sequence, the program advances from the step S403 to the step S501.

The step S501 controls the disc drive 104 to read, from the management information recording area of the optical disc 107, a signal of a representative picture for an audio visual data portion in the optical disc 107. The step S501 receives the read signal of the representative picture about the optical disc 107. The step S501 sends the signal of the representative picture about the optical disc 107 to the display 109 via the interface 106 (see FIG. 13). The display 109 presents the representative picture about the optical disc 107 to the user. The step S501 derives, from the inter-disc management information read by the step S402, at least one among ID of a signal of a representative picture for an audio visual data portion in the preceding optical disc and ID of a signal of a representative picture for an audio visual data portion in the following optical disc. The step S501 controls the disc drive 104 in response to the derived ID or IDs to read, from the management information recording area of the optical disc 107, at least one among the signal of the representative picture about the preceding optical disc and the signal of the representative picture about the following optical disc. The step S501 receives at least one among the signals of the representative pictures about the preceding and following optical discs. The step S501 sends at least one among the signals of the representative pictures about the preceding and following optical discs to the display 109 via the interface 106. The display 109 presents at least one among the representative pictures about the preceding and following optical discs to the user.

Furthermore, the step S501 derives, from the inter-disc management information read by the step S402, at least one among a set of the disc ID "DIDA" of the preceding optical disc and the data ID "BS#NA" of the audio visual data portion in the preceding optical disc and a set of the disc ID "NEXT" of the following optical disc and the data ID "NEXT" of the audio visual data portion in the following optical disc. The step S501 generates a signal of the relation of the representative picture about the current optical disc with at least one of the representative pictures about the preceding and following optical discs on the basis of the derived disc IDs and the derived data IDs. The step S501 sends the signal of the relation to the display 109 via the interface 106. The display 109 presents, to the user, the relation of the representative picture about the current optical disc with at least one of the representative pictures about the preceding and following optical discs.

In the case where the intermediate optical disc "B" (see FIG. 5) is set in the disc drive 104, the reproducing control section 905 (see FIG. 13) controls the disc drive 104 to read the intra-disc management information and the inter-disc management information from the optical disc "B". The disc drive 104 feeds the read intra-disc management information and the read inter-disc management information to the reproducing buffer 102. The reproducing control section 905 controls the reproducing buffer 102 to store the intra-disc management information and the inter-disc management information. The reproducing control section 905 derives IDs of signals of representative pictures about the preceding and following optical discs, that is, the first and last optical discs "A" and "C" (see FIG. 5) from the inter-disc management information in the reproducing buffer 102. The reproducing control section 905 controls the disc drive 104 in response to the derived IDs to read the signals of the representative pictures about the first and last optical discs "A" and "C" from the optical disc "B". The disc drive 104 feeds the read signals of the representative pictures to the reproducing buffer 102. The reproducing control section 905 controls the reproducing buffer 102 to store the signals of the representative pictures. Furthermore, the reproducing control section 905 controls the disc drive 104 to read, from the optical disc "B", a signal of a representative picture about the optical disc "B". The disc drive 104 feeds the read signal of the representative picture to the reproducing buffer 102. The reproducing control section 905 controls the reproducing buffer 102 to store the signal of the representative picture. Thus, the reproducing buffer 102 stores the signals of the representative pictures about the optical discs "A", "B", and "C".

The reproducing control section 905 reads the intra-disc management information, the inter-disc management information, and the signals of the representative pictures from the reproducing buffer 102. The reproducing control section 905 generates list information basically about audio visual data in the optical disc "B" in response to parameters in the intra-disc management information and the inter-disc management information, and the signals of the representative pictures. The list information represents a video list. The reproducing control section 905 sends the generated list information to the display 109 via the interface 106. The display 109 presents to the user the video list represented by the list information. The video list includes the representative pictures about the optical discs "A", "B", and "C" (the preceding, current, and following optical discs or the first, intermediate, last optical discs).

In FIG. 20, the step S501 implements the generation of the list information, and the action for enabling the display 109 to present to the user the video list represented by the list information.

Figure 21:
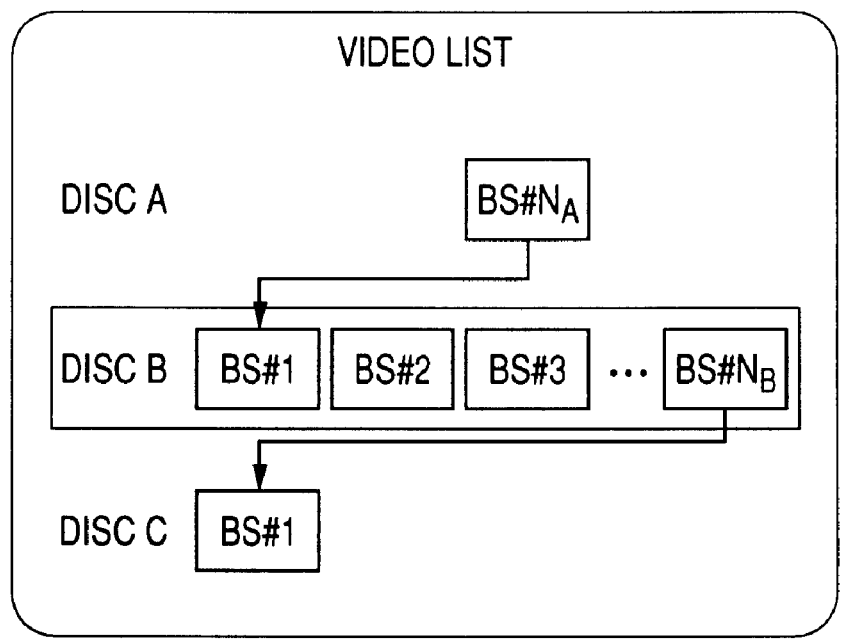
FIG. 21 is a diagram showing an example of a video list in a first state in the fifth embodiment of this invention.
Figure 22:
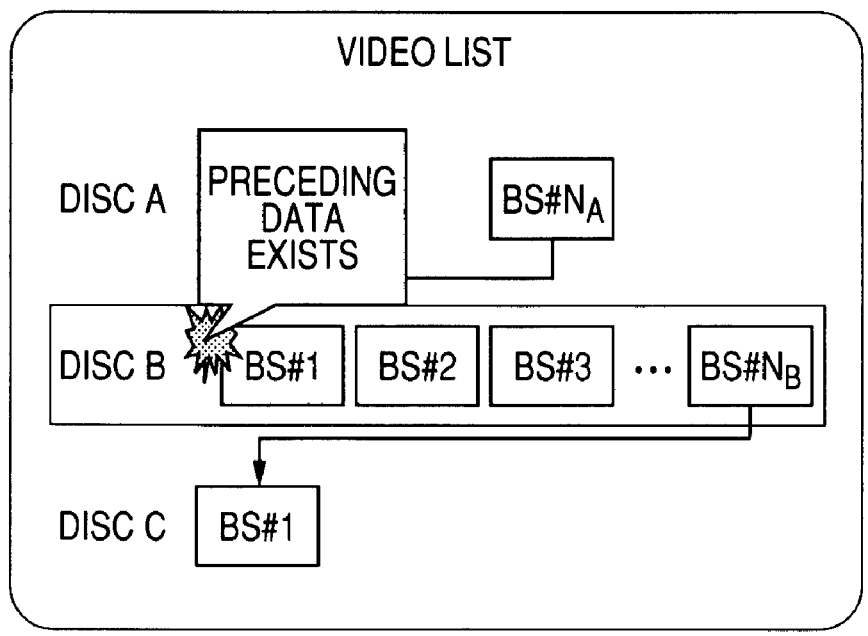
FIG. 22 is a diagram showing an example of the video list in a second state in the fifth embodiment of this invention.

FIG. 21 shows an example of the video list for the optical disc "B" which is presented to the user, and which is in a first state. FIG. 22 shows an example of the video list for the optical disc "B" which is presented to the user, and which is in a second state differing from the first state.

The video list in each of FIGS. 21 and 22 shows that the corresponding optical disc "B" stores audio visual data portions "BS#1", "BS#2", "BS#3", . . . , "BS#NB-1", that the audio visual data portion "BS#1" continues from an audio visual data portion "BS#NA" in the optical disc "A" while the audio visual data portion "BS#NB" continues to an audio visual data portion "BS#1" in the optical disc "C", and that the audio visual data portions "BS#2", "BS#3", . . . , and "BS#NB-1" are independent and do not have continuance relations with others.

In each of FIGS. 21 and 22, the representative picture about the optical disc "A" is indicated in the rectangle zone denoted by the data ID "BS#NA", and the representative pictures about the optical discs "B" and "C" are indicated in the respective rectangle zones denoted by the data ID "BS#1".

The reproducing control section 905 detects the continuance of audio visual data portions recorded on the optical discs "A", "B", and "C" from the inter-disc management information for the optical disc "B". The reproducing control section 905 determines the generated list information on the basis of the detected continuance of audio visual data so that the rectangles for continuous audio visual data portions will be connected by arrow lines as shown in FIGS. 21 and 22. Accordingly, the arrow lines denote the continuous audio visual data portions recorded on different optical discs respectively.

As previously mentioned, when the optical disc "B" is set in the disc drive 104, the video data reproducing apparatus reads from the optical disc "B" (1) the intra-disc management information, (2) the inter-disc management information, (3) the audio visual data, (4) the signal of the representative picture about the optical disc "B", (5) the signal of the representative picture about the optical disc "A", and (6) the signal of the representative picture about the optical disc "C". The apparatus presents to the user the representative picture about the optical disc "B" and the representative pictures about the optical disc "A" and "C" preceding and following the optical disc "B" as viewed in the direction of the continuous recording of audio visual data on a plurality of optical discs. Furthermore, the apparatus presents to the user the video list in which the continuance of the audio visual data portions recorded on the optical discs "A", "B", and "C" is denoted by the arrow lines.

Usually, by referring to the video list, the user actuates the input device 108 (see FIG. 13) and thereby selects one from all audio visual data portions in the optical disc "B" as an object to be played back. Here, "portion" basically means the whole, a first part, an intermediate part, or a last part of audio visual data representing one audio visual sequence (one content, one movie, or one television program). A signal of the user's selection is inputted into the apparatus. The interface 106 sends the inputted user's selection signal to the reproducing control section 905. The reproducing control section 905 accesses the intra-disc management information and the inter-disc management information in response to the user's selection signal, thereby obtaining disc address information about the selected audio visual data portion.

When the audio visual data portion "BS#1" in the optical disc "B" is selected by the user, the reproducing control section 905 checks the continuance-related condition of the selected audio visual data portion "BS#1" by referring to the inter-disc management information. Thereby, the reproducing control section 905 detects that the selected audio visual data portion "BS#1" continues from the audio visual data portion "BS#NA" in the optical disc "A". In this case, the reproducing control section 905 generates a signal of a message indicating the presence of the preceding audio visual data or indicating that the selected audio visual data portion "BS#1" continues from the audio visual data portion "BS#NA" in the optical disc "A". The reproducing control section 905 sends the signal of the message to the display 109 via the interface 106. The display 109 indicates the message in the presented video list. In FIG. 22, "preceding data exists" is the indicated message.

When the user holds the optical disc "B" in the disc drive 104 regardless of the indicated message, the reproducing control section 905 accesses the intra-disc management information and the inter-disc management information in response to the user's selection signal and thereby obtains disc address information about the selected audio visual data portion "BS#1". The reproducing control section 905 sends the obtained disc address information to the disc drive 104. The reproducing control section 905 controls the disc drive 104 to start data reproduction from the optical disc "B" at the obtained disc address information. Thereby, the disc drive 104 reads the selected audio visual data portion "BS#1" from the optical disc "B".

In some cases, the user replaces the optical disc "B" in the disc drive 104 with the optical disc "A" in response to the indicated message. When information from the disc drive 104 shows that the optical disc "A" is set therein, the reproducing control section 905 controls the disc drive 104 to read the inter-disc management information from the optical disc "A". The disc drive 104 feeds the inter-disc management information for the optical disc "A" to the reproducing buffer 102. The reproducing control section 905 controls the reproducing buffer 102 to store the inter-disc management information for the optical disc "A". The reproducing control section 905 accesses the inter-disc management information for the optical disc "A" in the reproducing buffer 102. The reproducing control section 905 derives the disc ID of the optical disc "A" from the accessed inter-disc management information. The reproducing control section 905 compares the derived disc ID of the optical disc "A" and the next-optical-disc ID in the inter-disc management information for the optical disc "B" which is stored in the reproducing buffer 102. The optical disc "A" is proved to be the desired one when the comparison result indicates that the two disc IDs are the same. Otherwise, the optical disc "A" is proved to be different from the desired one. When the optical disc "A" is proved to be the desired one, the reproducing control section 905 controls the disc drive 104 to read the intra-disc management information from the optical disc "A". The disc drive 104 feeds the intra-disc management information for the optical disc "A" to the reproducing buffer 102. The reproducing control section 905 controls the reproducing buffer 102 to store the intra-disc management information for the optical disc "A".

Subsequently, the reproducing control section 905 obtains disc address information about the audio visual data portion "BS#NA" on the basis of the intra-disc management information and the inter-disc management information for the optical disc "A" in the reproducing buffer 102. The reproducing control section 905 sends the obtained disc address information to the disc drive 104. The reproducing control section 905 controls the disc drive 104 to start data reproduction from the optical disc "A" at the obtained disc address information. Thereby, the disc drive 104 reads the audio visual data portion "BS#NA" from the optical disc "A".

On the other hand, when the comparison result indicates that the two disc IDs are different, the reproducing control section 905 generates a signal of a message for urging the user to set the correct optical disc in the disc drive 104. The reproducing control section 905 sends the signal of the message to the display 109 via the interface 106. The display 109 presents the message to the user.

The video data reproducing apparatus can reproduce audio visual data from two, three, four, or more optical discs subjected to a continuous recording procedure by the video data recording apparatus. As previously mentioned, the video data reproducing apparatus implements the generation of signals of representative pictures, the recording of the representative picture signals on optical discs, and the setting of IDs of the representative picture signals in inter-disc management information for the optical discs.

As shown in FIGS. 21 and 22, the representative pictures for the audio visual data portions in the optical discs "A", "B", and "C" are presented to the user. In addition, the continuance of the audio visual data portions in the optical discs "A", "B", and "C" is presented to the user as the arrow lines. Therefore, more detailed and comprehensible information about the audio visual data portions in the optical discs "A", "B", and "C" and the continuance thereof is available to the user.

Sixth Embodiment

A sixth embodiment of this invention is similar to one of the first to fifth embodiments thereof except for the following design changes. According to the sixth embodiment of this invention, a recording medium stores the control program for the recording control section 105 or the reproducing control section 905. The control program is read from the recording medium by a drive therefor before being loaded into the recording control section 105 or the reproducing control section 905. Alternatively, the control program may be downloaded into the recording control section 105 or the reproducing control section 905 from a communication network through the use of a communication interface.

Seventh Embodiment

A seventh embodiment of this invention is similar to one of the first to fifth embodiments thereof except that the optical disc 107 is replaced by another recording medium such as a memory or a hard disc.

What is claimed is:

1. A video data recording apparatus comprising:
   means for dividing video data into at least three portions and sequentially recording the video data portions on at least three recording mediums respectively, the recording mediums being removable;
   means for setting IDs of the respective recording mediums, and IDs of the respective video data portions;
   means for recording, on first one among the recording mediums, the ID of the first recording medium, the ID of first one among the video data portions which is recorded on the first recording medium, the ID of second one among the recording mediums which follows the first recording medium, and the ID of second one among the video data portions which is recorded on the second recording medium;
   means for recording, on last one among the recording mediums, the ID of the last recording medium, the ID of last one among the video data portions which is recorded on the last recording medium, the ID of second last one among the recording mediums which precedes the last recording medium, and the ID of second last one among the video data portions which is recorded on the second last recording medium;
   wherein the ID of third one among the recording mediums which follows the second recording medium and the ID of third one among the video data portions which is recorded on the third recording medium are not recorded on the first recording medium, and the ID of third last one among the recording mediums which precedes the second last recording medium and the ID of third last one among the video data portions which is recorded on the third last recording medium are not recorded on the last recording medium;
   the video data recording apparatus further comprising
   means for assigning playback order numbers to the video data portions respectively;
   means for generating information pieces indicative of the assigned playback order numbers respectively; and
   means for recording the information pieces indicative of the assigned playback order numbers on the recording mediums respectively.

2. A video data recording apparatus as recited in claim 1, further comprising means for recording, on intermediate one among the recording mediums, the ID of the intermediate recording medium, the ID of intermediate one among the video data portions which is recorded on the intermediate recording medium, the ID of preceding one among the recording mediums which precedes the intermediate recording medium, the ID of preceding one among the video data portions which is recorded on the preceding recording medium, the ID of following one among the recording mediums which follows the intermediate recording medium, and the ID of following one among the video data portions which is recorded on the following recording medium.

3. A video data recording apparatus as recited in claim 1, further comprising means for setting an ID of the video data, and means for recording the ID of the video data on each of the recording mediums on which the video data portions are recorded respectively.

4. A video data recording apparatus as recited in claim 2, further comprising means for generating a signal indicative of a representative of pictures represented by each of the video data portions and setting an ID of the generated representative picture signal, and means for recording, on the intermediate recording medium, the representative picture signal for the video data portion recorded on the preceding recording medium, the ID of the representative picture signal for the video data portion recorded on the preceding recording medium, the representative picture signal for the video data portion recorded on the following recording medium, and the ID of the representative picture signal for the video data portion recorded on the following recording medium.

5. A method of recording video data on at least three recording mediums, comprising the steps of:
   dividing the video data into at least three portions and sequentially recording the video data portions on the recording mediums respectively, the recording mediums being removable;
   setting IDs of the respective recording mediums, and IDs of the respective video data portions;
   recording, on first one among the recording mediums, the ID of the first recording medium, the ID of first one among the video data portions which is recorded on the first recording medium, the ID of second one among the recording mediums which follows the first recording medium, and the ID of second one among the video data portions which is recorded on the second recording medium; and
   recording, on last one among the recording mediums, the ID of the last recording medium, the ID of last one among the video data portions which is recorded on the last recording medium, the ID of second last one among the recording mediums which precedes the last recording medium, and the ID of second last one among the video data portions which is recorded on the second last recording medium;
   wherein the ID of third one among the recording mediums which follows the second recording medium and the ID of third one among the video data portions which is recorded on the third recording medium are not recorded on the first recording medium, and the ID of third last one among the recording mediums which precedes the second last recording medium and the ID of third last one among the video data portions which is recorded on the third last recording medium are not recorded on the last recording medium;
   the method further comprising the steps of
   assigning playback order numbers to the video data portions respectively;
   generating information pieces indicative of the assigned playback order numbers respectively; and
   recording the information pieces indicative of the assigned playback order numbers on the recording mediums respectively.

* * * * *